(12) United States Patent
Velasco et al.

(10) Patent No.: US 12,393,402 B2
(45) Date of Patent: Aug. 19, 2025

(54) SYSTEMS FOR DESIGNING CUSTOM APPLICATIONS

(71) Applicant: MicroStrategy Incorporated, Vienna, VA (US)

(72) Inventors: Alejandro Olvera Velasco, Falls Church, VA (US); Jose Nocedal de la Garza, Leesburg, VA (US); Timothy Lang, McLean, VA (US); Holly Stevens, Winchester, VA (US); Andrew Smith, Oakton, VA (US); Wei Jiang, Hangzhou (CN); Jin Liu, Hangzhou (CN); Divya Singh, Chantilly, VA (US); Qingru Shen, Arlington, VA (US)

(73) Assignee: MicroStrategy Incorporated, Vienna, VA (US)

( * ) Notice: Subject to any disclaimer, the term of this patent is extended or adjusted under 35 U.S.C. 154(b) by 32 days.

(21) Appl. No.: 18/080,708

(22) Filed: Dec. 13, 2022

(65) Prior Publication Data

US 2024/0192926 A1    Jun. 13, 2024

(51) Int. Cl.
*G06F 8/20* (2018.01)
*G06F 8/71* (2018.01)

(52) U.S. Cl.
CPC . *G06F 8/20* (2013.01); *G06F 8/71* (2013.01)

(58) Field of Classification Search
CPC ..... G06F 8/20; G06F 8/71; G06F 8/70; G06F 8/60

(Continued)

(56) References Cited

U.S. PATENT DOCUMENTS 8,635,287 B1    1/2014   Shih et al.
8,719,339 B2    5/2014   Reisman
(Continued)

OTHER PUBLICATIONS blog.MicroStrategy.com [online], "MicroStrategy 2021 Update 4 CTO Newsletter," Dec. 17, 2021, retrieved on Jan. 11, 2023, retrieved from URL <https://blog.microstrategy.com/microstrategy-2021-update-4-cto-newsletter-cf695607fd17>, 10 pages.

(Continued)

*Primary Examiner* — Thuy Dao
*Assistant Examiner* — Zengpu We
(74) *Attorney, Agent, or Firm* — Fish & Richardson P.C.

(57) ABSTRACT

Methods, systems, and apparatus, including computer programs encoded on computer-storage media, for designing custom applications. In some implementations, a system identifies a predetermined set of application elements that are available to be selectively included in a custom application. The system provides an interface for generating the custom application, wherein the interface includes features to specify each of a plurality of adjustable settings, such that input through the interface can adjust an appearance of the custom application and select which of the predetermined application features are included in the custom application. The system receives input through the interface that specifies settings for the custom application. Based on the input received through the interface, the system generates configuration data for the custom application and updates one or more records to make the custom application available to one or more client devices of one or more users.

18 Claims, 13 Drawing Sheets

(58) Field of Classification Search
USPC .......................................................... 717/105
See application file for complete search history.

(56) References Cited

U.S. PATENT DOCUMENTS

| | | | |
|---|---|---|---|
| 8,978,006 | B2 | 3/2015 | Hirsch et al. |
| 8,978,106 | B2 | 3/2015 | Swamy et al. |
| 9,134,964 | B2 | 9/2015 | Hirsch et al. |
| 9,305,275 | B2 | 4/2016 | McLachlan |
| 9,858,063 | B2 | 1/2018 | Jain et al. |
| 10,133,558 | B2 | 11/2018 | Farooqi |
| 10,248,401 | B1 | 4/2019 | Chen et al. |
| 10,733,266 | B2 | 8/2020 | Whitehurst |
| 10,747,944 | B1 | 8/2020 | Kirkpatrick et al. |
| 2005/0257190 | A1 | 11/2005 | Shaburov et al. |
| 2007/0168962 | A1 | 7/2007 | Heinke et al. |
| 2007/0180386 | A1 | 8/2007 | Ballard et al. |
| 2008/0034314 | A1 | 2/2008 | Louch et al. |
| 2009/0119678 | A1 | 5/2009 | Shih et al. |
| 2011/0145782 | A1* | 6/2011 | Brukner ................. G06F 8/74 717/106 |
| 2012/0047029 | A1 | 2/2012 | Veres et al. |
| 2012/0260232 | A1 | 10/2012 | Hirsch et al. |
| 2013/0047138 | A1* | 2/2013 | Radez ................... G06F 8/61 717/121 |
| 2013/0247005 | A1 | 9/2013 | Hirsch et al. |
| 2013/0305218 | A1 | 11/2013 | Hirsch et al. |
| 2014/0026113 | A1 | 1/2014 | Farooqi |
| 2014/0109046 | A1 | 4/2014 | Hirsch et al. |
| 2014/0109072 | A1 | 4/2014 | Lang et al. |
| 2014/0109115 | A1 | 4/2014 | Low et al. |
| 2014/0201707 | A1 | 7/2014 | Schroeder |
| 2014/0278536 | A1 | 9/2014 | Zhang et al. |
| 2014/0358482 | A1 | 12/2014 | Sehgal et al. |
| 2015/0135160 | A1 | 5/2015 | Gauvin et al. |
| 2017/0139725 | A1* | 5/2017 | Koufogiannakis ................. G06F 9/44505 |
| 2017/0337040 | A1 | 11/2017 | Salvi et al. |
| 2018/0074796 | A1* | 3/2018 | Alabes ................... G06F 8/10 |
| 2018/0129581 | A1* | 5/2018 | Abadi ................... G06F 8/71 |
| 2018/0157468 | A1 | 6/2018 | Stachura |
| 2018/0176097 | A1 | 6/2018 | Russell et al. |
| 2019/0065177 | A1* | 2/2019 | Khoongumjorn ......... G06F 8/71 |
| 2021/0096826 | A1* | 4/2021 | Duggal .............. G06Q 30/0283 |
| 2021/0211362 | A1* | 7/2021 | Vihervuori .......... H04L 41/0266 |
| 2021/0256627 | A1 | 8/2021 | Hollis et al. |
| 2021/0326237 | A1* | 10/2021 | Moser ....................... G06F 8/71 |
| 2022/0215019 | A1 | 7/2022 | Cohen et al. |
| 2023/0022493 | A1* | 1/2023 | Madhugiri ............ G06F 16/986 |
| 2023/0083894 | A1* | 3/2023 | Duggal ................... G06F 8/316 717/107 |
| 2023/0176824 | A1* | 6/2023 | Ghosh .............. G06Q 10/06311 717/107 |
| 2023/0195424 | A1* | 6/2023 | Shin ......................... G06F 8/34 717/109 |
| 2024/0192952 | A1 | 6/2024 | Velasco et al. |

OTHER PUBLICATIONS community.MicroStrategy.com [online], "Create New Applications in Workstation," Dec. 3, 2019, retrieved on Jan. 11, 2023, retrieved from URL <https://community.microstrategy.com/s/article/Create-new-application-in-Workstation?language=en_US>, 2 pages.

MicroStrategy.com [online], "Enterprise Analytics: A technical guide to the architecture of the industry's leading enterprise analytics platform," 2016, retrieved on Jan. 11, 2013, retrieved from URL <https://www3.microstrategy.com/getmedia/37b67e27-bf17-4738-a889-2b850ca2fa28/architecture-for-enterprise-bi.pdf>, 108 pages.

MicroStrategy.com [online], "MicroStrategy 2021 Readme," Version 2021, Jan. 2023, retrieved on Jan. 11, 2023, retrieved from URL <https://www2.microstrategy.com/producthelp/Current/manuals/en/Readme.pdf>, 222 pages.

TechTarget.com [online], "App development a focus of MicroStrategy analytics platform," Feb. 2, 2022, retrieved on Jan. 11, 2023, retrieved from URL <https://www.techtarget.com/searchbusinessanalytics/news/252512831/App-development-a-focus-of-MicroStrategy-analytics-platform>, 4 pages.

Office Action in U.S. Appl. No. 18/080,714, dated May 22, 2024, 17 pages.

Notice of Allowance in U.S. Appl. No. 18/080,714, dated Jan. 23, 2025, 18 pages.

Notice of Allowance in U.S. Appl. No. 18/080,714, dated Sep. 16, 2024, 17 pages.

* cited by examiner

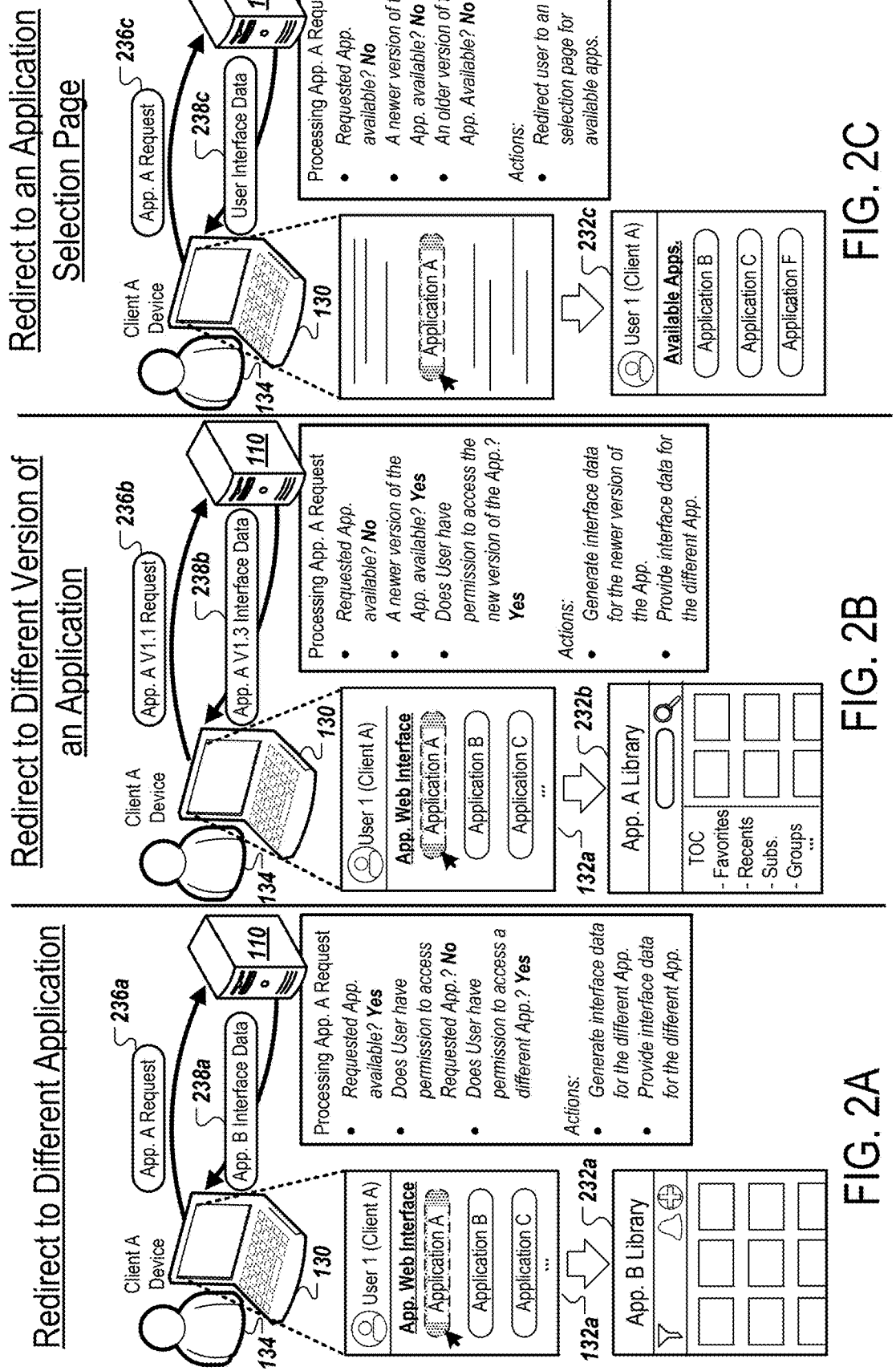

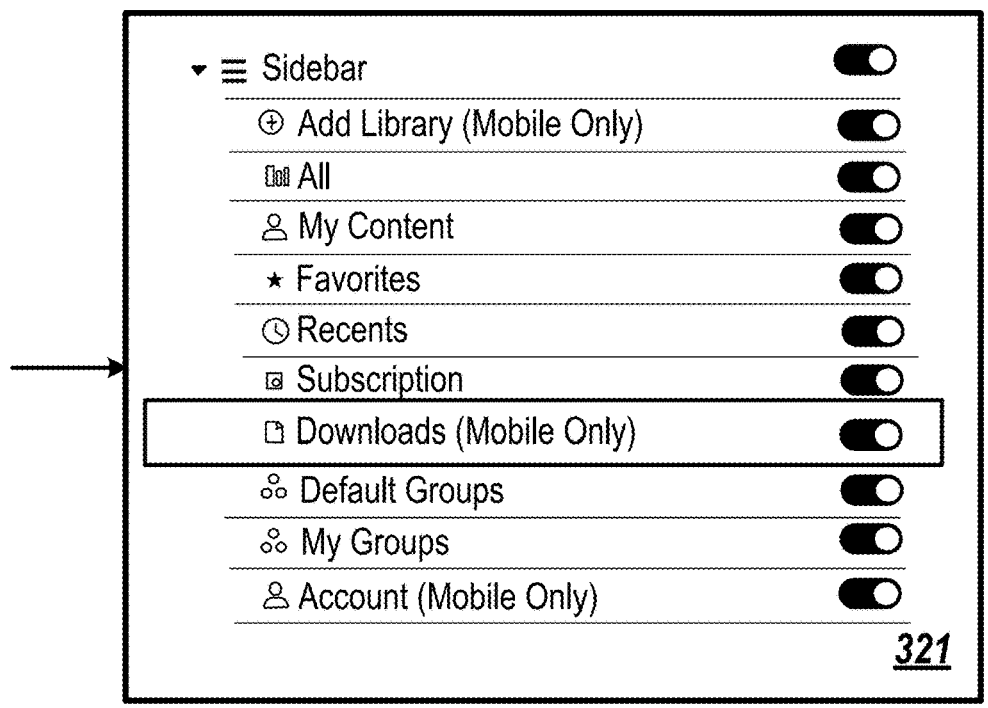
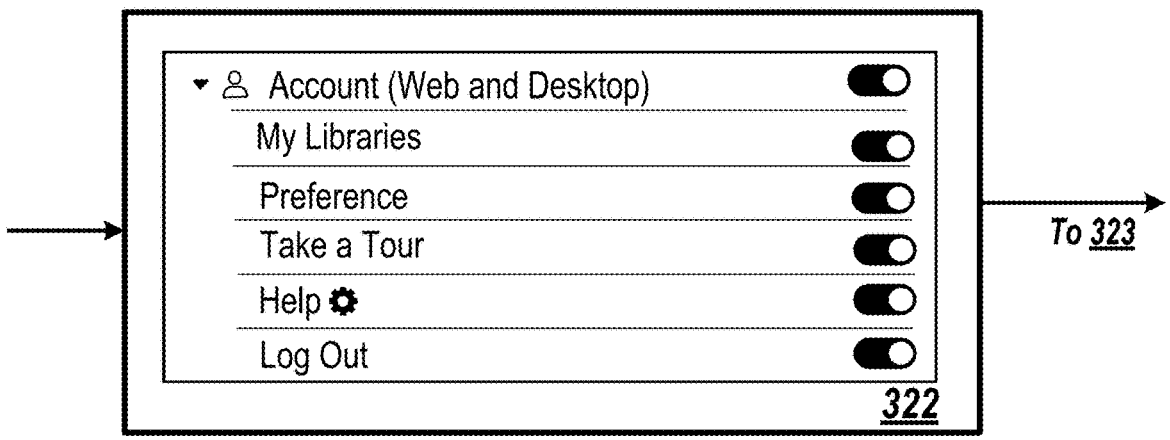
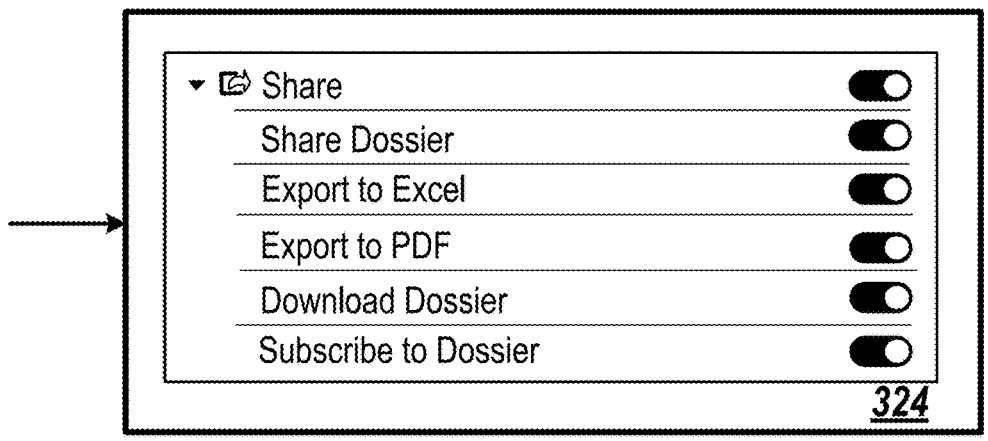
FIG. 3C-2

400

```
┌─────────────────────────────────────────────────────────┐
│ identify, by one or more computers, a predetermined set │
│ of application elements that are available to be        │
│ selectively included in a custom application hosted by  │
│ a server system                                    402  │
└─────────────────────────────────────────────────────────┘
                            │
                            ▼
┌─────────────────────────────────────────────────────────┐
│ provide, by the one or more computers, an interface for │
│ generating the custom application, wherein the interface│
│ includes features to specify each of a plurality of     │
│ adjustable settings, such that input through the        │
│ interface can adjust an appearance of the custom        │
│ application and select which of the predetermined       │
│ application features are included in the custom         │
│ application                                        404  │
└─────────────────────────────────────────────────────────┘
                            │
                            ▼
┌─────────────────────────────────────────────────────────┐
│ receive, by the one or more computers, input through the│
│ interface that specifies settings for the custom        │
│ application including at least one of (i) a change to   │
│ the appearance of the custom application or (ii) a      │
│ customized set of the application features         406  │
└─────────────────────────────────────────────────────────┘
                            │
                            ▼
┌─────────────────────────────────────────────────────────┐
│ based on the input received through the interface,      │
│ generate, by the one or more computers, configuration   │
│ data for the custom application, wherein the            │
│ configuration data specifies a configuration of the     │
│ application elements to provide in the custom           │
│ application based on the input received through the     │
│ interface                                          408  │
└─────────────────────────────────────────────────────────┘
                            │
                            ▼
┌─────────────────────────────────────────────────────────┐
│ update, by the one or more computers, one or more       │
│ records to make the custom application available to one │
│ or more client devices of one or more users, wherein the│
│ server system is configured to response to requests from│
│ client devices by generating and providing application  │
│ data based on the stored configuration data        410  │
└─────────────────────────────────────────────────────────┘
```

FIG. 4

SYSTEMS FOR DESIGNING CUSTOM APPLICATIONS

TECHNICAL FIELD

The present specification relates to developing and deploying custom applications.

BACKGROUND

Traditionally, software applications are installed and run on computing devices. Installing these computer applications can involve establishing commands, shortcuts, scripts, or services on the computing devices for executing the computer applications. Traditionally, to update these applications, new software code (e.g., an update package) is transferred to the computing devices. The data can then be used by the computing devices to update all or part of the computer applications.

SUMMARY

In some implementations, a computing system provides functionality to enable a user (e.g., an administrator) to develop and deploy custom applications. The computing system allows different users to design their own custom applications without writing any software code, and then distribute the custom applications selectively to other users through a set of design tools provided by the computing system. Using the design tools, the administrator can specify, for example, the functionality of a custom application, the layout and appearance of the custom application, and permissions for accessing the custom application. Once the administrator has completed the design of the custom application, the computing system can store configuration data that defines the custom application. The computer system later uses the configuration data for the custom app to generate and serve data of the application in response to requests for the application.

The custom applications developed using the computer system can be server-based or hosted by the computer system rather than being installed on or persistently resident on client devices. As discussed below, this can provide many advantages, such as enhanced security and improved cross-platform support for the custom application. In addition, each time the custom application is loaded, the user interface can be based on the most up-to-date information present at the server, so that each user session loads with the most current information available.

The server can store the configuration data that defines the content and behavior of the custom application separately from the code or modules that implement various application features. Because of this separation, the two sets of data can be updated independently from each other without causing conflicts or losing changes. For example, the administrator can alter the configuration data that defines the custom application, and as needed the server system selects and uses a corresponding set of modules to implement the selected features. Changes that an administrator makes to the custom application are captured in the configuration data and are not lost if the code implementing the features changes. Similarly, even if the administrator does not change the configuration data, the platform provider may update the feature-implementing modules to enhance security, add additional features, improve compatibility, and so on. When the application is run or served, the server system uses the configuration data to identify the modules needed, and the server system retrieves and uses the most recent, up-to-date versions of the modules that the configuration data specifies. As a result, the administrator's custom application settings are preserved, while allowing seamless ongoing upgradeability.

In some implementations, after a custom application is defined or created, a server system can generate and provide the application data dynamically for each use or session, e.g., just-in-time or on the fly, in response to requests to access the custom applications. For example, rather than storing a static, pre-compiled binary version of the application, and instead of installing an application on a user's device, the server can be configured to retrieve and combine the stored modules that form the custom application, as directed by the configuration data for the custom application. In response to receiving a request for a custom application from a user of a client device, the server system can access configuration data for the custom application, determine a set of modules required for the custom application from the configuration data, and use the set of modules to generate user interface data to provide to the client device. The set of modules can include modules for different features of the custom application, such as a search module that provides a text search functionality for the custom application allowing a user to search through the content of the custom application and a filter module that provides filtering functionality allowing a user to filter the content displayed in the custom application.

The different modules that the server system uses to generate or provide application data can be independently updated over time. As an example, the computing system can generate the interface data using a first version of a search module in response to the request for the custom application. After some time passes, the computing system may receive a new version of the search module. The next time the computing system receives a request for the custom application, the computing system can access the new version of the search module instead of the first version, and use the new version to generate. The computing system may continue to store one or more previous versions of modules, for example an immediately preceding version of each module in case the newest versions of the modules experience errors.

In some implementations, the computing system uses an existing document to develop a custom application. For example, a client can select an existing document as a basis for a new application. The document may be part of or otherwise accessible to the computing system or can be uploaded by the client to the computer system. The computing system can extract information from the document, such as information indicating the different types of functionality that has already been integrated into the document (e.g., search functionality), design elements (e.g., background images, page layout, etc.), content included in the document, or the like. The computing system can then use this information to determine a configuration for the new application and generate a data object that includes the configuration information. The computing system can additionally or alternatively set the selected document as a home screen for the new application.

In some implementations, a modifiable document can be added to or used to develop a custom application. For example, a user of a client device can select a document to be included in a custom application. Based on this selection, the computing system can create a new version of the document for the custom application. After the application is deployed, users of the custom application can edit or otherwise make changes to the document that are then viewable to other users of the custom application. As another example, a document used to generate a custom application (e.g., that is to serve as a home screen for the custom application) can include links to other documents. Based on this, the computer system can generate new versions of the linked documents and create new links to the new versions for inclusion in the custom application. In both examples, changes made to the documents through the custom application can be viewed by users of the custom application, however these changes are not propagated to the original versions of the documents.

In some implementations, the computing system redirects users attempting to access an application to a different application, a different version of the application, or to an application selection page. For example, after receiving a request for an application, the computing system can determine while processing the request that the user making the request does not have permission to access the application. In response, the computing system can redirect the user to a different application that the user is permitted to access or to a different version of the application that the user is permitted to access. To accomplish this, the computing system can access configuration data for the different application or the different version of the application and generate corresponding interface data to provide to the client device of the user.

In one general aspect, a method includes: storing, by a server system, configuration data that specifies a configuration of application elements, from among a predetermined set of application elements, to provide in a custom application; storing, by the server system, a repository of modules that are used to implement the respective application elements; receiving, by the server system, a request from a client device over a network; in response to receiving the request, generating, by the server system, user interface data for a view of the custom application, wherein the server system (i) identifies the configuration of the application elements for the custom application based on the configuration data for the custom application and (ii) generates the user interface data using modules from the repository that correspond to the application elements specified in the configuration data; and providing, by the server system, the user interface data for the custom application to the client device over the network in response to the request.

In some implementations, the configuration data comprises a set of values that specify a subset of the application elements for inclusion in the custom application.

In some implementations, generating the user interface data for the view of the custom application comprises: generating the user interface data such that the user interface data (i) includes the modules from the repository that correspond to the application elements included in the subset, and (ii) omits modules from the repository that correspond to the application elements that are not included in the subset.

In some implementations, the set of values in the configuration data specifies a range of values available for a user of the custom application to select for a corresponding application element.

In some implementations, the configuration data indicates, for each of the application elements specified in the configuration data, whether the application element is included in the custom application.

In some implementations, the user interface data specifies at least one of (i) a layout, (ii) formatting, or (ii) media used to present the view of the custom application.

In some implementations, the server system stores a different set of configuration data for each of multiple custom applications provided by the server system, and wherein each of the sets of configuration data specifies a different set of application elements.

In some implementations, the method includes: receiving a request from a client device to access a second custom application; determining that a user of the client device does not have authorization to access the second custom application; and in response to determining that the user of the client device does not have authorization to access the second custom application, providing user interface data for controls to select one or more custom applications that the user has authorization to access.

In some implementations, the method includes: receiving a request from a client device to access a second custom application; determining that a user of the client device does not have authorization to access the second custom application; and in response to determining that the user of the client device does not have authorization to access the second custom application: selecting, from among a set of custom applications, a third custom application that is most similar to the second custom application; and providing access to the third custom application in response to the request.

In some implementations, the method includes: receiving a request from a client device to access a second custom application; determining whether the second custom application is not available; in response to determining that the second custom application is not available, determining that a newer version of the second custom application is available; and providing user interface data for the newer version of the second custom application to the client device.

In some implementations, the method includes providing user interface data for a selection page to the client device over the network, the user interface data for the selection page allowing a user of the client device to select a custom application from among a list of custom applications.

In another general aspect, a method performed by one or more computers includes: identifying, by the one or more computers, a predetermined set of application elements that are available to be selectively included in a custom application hosted by a server system; providing, by the one or more computers, an interface for generating the custom application, wherein the interface includes features to specify each of a plurality of adjustable settings, such that input through the interface can adjust an appearance of the custom application and select which of the predetermined application features are included in the custom application; receiving, by the one or more computers, input through the interface that specifies settings for the custom application including at least one of (i) a change to the appearance of the custom application or (ii) a customized set of the application features; based on the input received through the interface, generating, by the one or more computers, configuration data for the custom application, wherein the configuration data specifies a configuration of the application elements to provide in the custom application based on the input received through the interface; and updating, by the one or more computers, one or more records to make the custom application available to one or more client devices of one or more users, wherein the server system is configured to response to requests from client devices by generating and providing application data based on the stored configuration data.

In some implementations, providing the interface comprises providing a web page or web application that includes data that, when rendered, provides a user interface for designing the custom application.

In some implementations, providing the interface comprises presenting a user interface of an application running on the one or more computers.

In some implementations, the input specifies formatting for the application, and configuration data stores the formatting such that, when the application is provided based on the configuration data, the formatting is propagated to each of multiple application elements selected to be included in the custom application.

In some implementations, the custom application provides access to each of multiple documents; and the interface provides one or more controls that enable a user to specify a theme to apply to a single document of the multiple documents or to each of the multiple documents.

In some implementations, the interface is a user interface having controls that enable a user to (i) specify content for access within the custom application, wherein the content is selected from among content hosted by a database system, and (ii) restrict the custom application to providing content specified through the interface.

In some implementations, the application features include features that respectively perform different functions, the features including at least one of search, filter, share, comment on, or export data.

In some implementations, the application features include navigation features for navigating within the custom application, the features including at least one of a toolbar, a sidebar, or menu item.

In some implementations, the application features include features representing different types of user interaction or application behavior is permitted in the custom application.

In some implementations, the application features include cross-platform features available in each of multiple platforms and platform-specific features available only in specific platforms, wherein the interface provides controls to select from among the cross-platform features and the platform-specific features.

In some implementations, the interface includes functionality to specify users or user groups that are authorized to access the custom application.

In some implementations, the interface includes functionality to specify at least one of authentication protocols or network configuration settings for the custom application.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 2A-2C are diagrams showing different examples for redirecting requests for custom applications.

FIG. 4 is a flow diagram showing a method performed by one or more computers.

Like reference numbers and designations in the various drawings indicate like elements.

DETAILED DESCRIPTION

Figure 1:
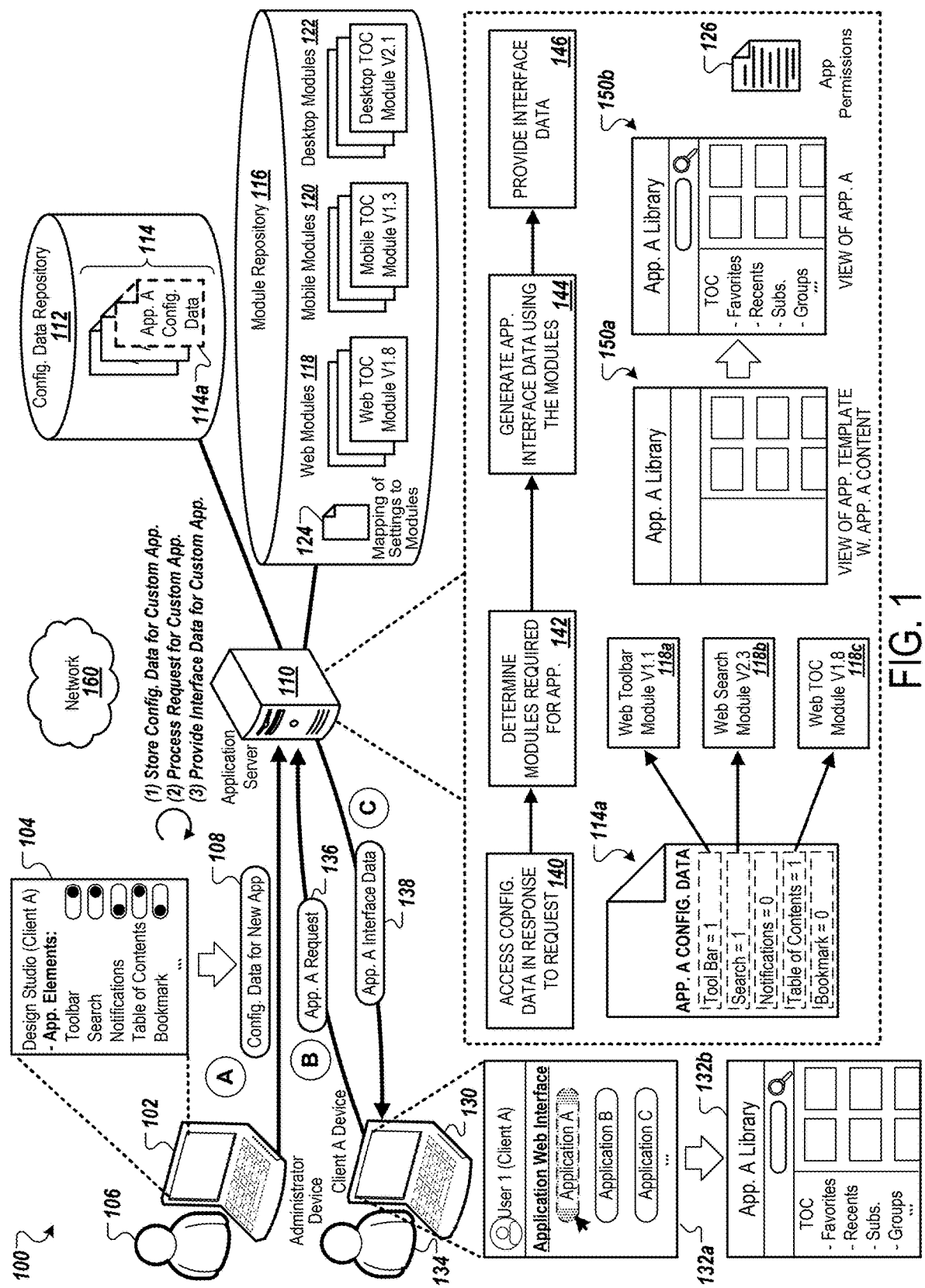
FIG. 1 is a diagram showing an example of a system for developing and deploying custom applications.

In some implementations, a computing system is used to develop and deploy custom applications. The computing system allows different third-parties to design their own custom applications through a design toolset provided by the computing system. Using the design toolset, a user of a client device can specify, for example, the functionality of a custom application, the layout and appearance of the custom application, and permissions for accessing the custom application. Once the user has completed the design of the custom application, the computing system can store data that represents the resulting configuration for the custom application and, later, use this data to deploy the application in response to requests for the application.

The computing system can deploy custom applications on the fly in response to application requests. For example, in response to receiving a request for a custom application from a user of a client device, the computing system can access configuration data for the custom application, determine a set of modules required for the custom application from the configuration data, and use the set of modules to generate user interface data to provide to the client device. The set of modules can include modules for different features of the custom application, such as a search module that provides a text search functionality for the custom application allowing a user to search through the content of the custom application and a filter module that provides filtering functionality allowing a user to filter the content displayed in the custom application.

The system enables administrators to create applications that leverage and make use of the functionality of an enterprise system's database servers, application servers, and other network infrastructure. For example, different companies can each have their own instances of a database server, document library, application server, etc. The custom applications created for a company can be hosted by and served from a server instance for that company, whether in cloud computing resources, on-premises resources, a datacenter, etc. The custom applications for a company can then leverage the company's own databases, document libraries, and other resources within the custom applications.

As discussed below, the server provides administrators of an enterprise system the ability to quickly create custom applications and distribute them to users. The custom applications can be created with no coding required, and can be based on existing custom documents (e.g., dashboards, visualizations, interactive documents, reports, etc.) and/or based on existing application interfaces (such as a document library interface) or templates from a platform provider. The system provides a set of features that can be included in custom applications and a repository of modules for implementing those features. As a result, the system provides a discrete set of functionality that is ready for an administrator to select from for inclusion in a new application. The server can also provide functionality to set custom visual themes or make changes to layout and formatting. Applications are hosted by an organization's server infrastructure and can connect to the organization's database system and data sources (e.g., OLAP data cubes, distributed file systems, etc.).

In general, the custom applications are server-based. Rather than applications being downloaded and remaining resident on client devices, a server can dynamically generate and provide each application each time a session of use of the application begins. For each session of use, the application is dynamically created by the server from stored configuration data that defines the properties of the application. This configuration data can include various settings and metadata that have been specified to define how the application appears and behaves. Many aspects of applications that have typically been hard-coded or compiled into application binaries are instead defined in custom applications as values of attributes or parameters. Each custom application can have its own application identifier and corresponding set of configuration data that specifies the features, elements, or attributes of the custom application. The server creates the actual application content or user interface data for the application on demand, in a just-in-time manner, each time access to the application is requested, then transfers the application data to the client over the network. In the creation of the application, content for each custom application does not need to be compiled or packaged in advance for installation at client devices. Instead, the new application is registered with the system, and configuration data specifying the properties of the custom application is saved, and the server assembles the components of each custom application dynamically each time it is requested by client devices.

The server-based arrangement facilitates updates to a custom application by the administrator so the updates can be easy and seamless. When an administrator makes changes to a custom application and the configuration data defining the application is saved, each new session of the application will automatically have application data generated using the updated configuration data, and there is no need to separately distribute updates to any installed applications on the client devices. This allows great flexibility in customization by the administrator (e.g., specifying which interface elements should be presented and how). The configuration data and separate modules for implementing application features provide different layers for setting and adjusting application functionality.

The server-based applications also facilitate updates to the server platform and application platform. The server can include a library of modules (e.g., libraries, scripts, code segments, etc.) that are available to implement various different application features that administrators may select to include in custom applications. The library of modules can be shared so that the same set of modules can be used to provide views of any of the custom applications that the server provides. For example, if two different custom applications each include a search toolbar, the same search toolbar module from the module library can be used to implement the search toolbar in the custom applications. In this way, the server can store and re-use assets for efficiency and consistency across a set of custom applications.

Because the modules are separate from the application-specific configuration data, the modules and application configuration can be updated independently. For example, the platform provider can provide an upgraded search toolbar module for the module library (e.g., one that adds functionality, improves compatibility, improves performance, improves security, etc.). Without any action by the administrator that defined the custom applications, and without any change to the application definitions, the server can use the upgraded search toolbar module from the module library to provide the application data for any previously-defined or later-defined custom applications. In other words, the server can update a mapping between application elements (e.g., the search toolbar, or a particular application element identifier) and modules (e.g., so the application element previously mapped to toolbar version 1.0 is now mapped to toolbar version 2.0). In this way, customizations that are made to an application by an administrator are not lost when platform elements are updated, and customizations that the administrator makes to the custom application do not interfere with the functional modules that make up functional application components.

In general, application configuration data defines the application content and behavior, and system assembles the application or user interface view just in time. Generating the application data on the fly ensures the most up-to-date functionality is provided (e.g., fully-featured, high compatibility, secure). When a new database feature or optimization is released, or when an API is updated, the modules are updated also to take advantage of it. The effect is that all custom applications automatically receive the most fully-featured elements and highest security and compatibility automatically, without any action by the administrator. A central system can push updates to modules and mappings along with server updates.

In some prior systems, administrators would make customizations for mobile applications, and the changes to the code would interfere with the functional capabilities of the application. Or, even if the customizations operated properly, upgrades from the platform provider would remove customizations and return modules to a default state. In the present system, administrator-specified customizations are stored, maintained, and persisted across upgrades, because the feature definition or user experience definition is defined in the configuration data (e.g., application definition), which is decoupled from the implementing code modules. The actual executable code and components of the custom applications can be upgraded (through the modules) without losing customizations to the application appearance and behavior.

The system also facilitates cross-platform deployment of the applications. For example, the configuration data that provides custom application definitions is platform-independent. The system can store mappings of application features to modules that specify different modules for different platforms. As a result, using a single set of configuration data or application definition, the server can use mobile-optimized modules to assemble the application just-in-time for mobile devices, can use desktop-optimized modules to assemble the application just-in-time for desktop computers, and can use modules designed for the particular operating system of the client device requesting access. The system detects the platform that the application is requested on, and automatically assembles the features as needed from the set of modules for the requesting platform. The same hyperlink or URL can trigger the handshake process to determine the appropriate platform so the server can generate the application data that best suits the requesting client device.

In some implementations, custom applications can be based on a default interface, such as a document library view. Custom applications can provide a customized portal or window into various types of functionality made available by an application server and/or database server. For example, a custom application can provide a view of the user's personal document library, with contents tracked and hosted by the server, as the default or home view. For example, the custom application can leverage the server's capabilities to show each user his or her own most frequently accessed or most recently accessed documents, and can provide the user the ability to access those documents (e.g., view, edit, annotate, save, share, etc.). As a result, the custom application can be a portal to the various documents, applications, data sets, and other content that the user is authorized to access on the server. For any given custom application, each user of the application has content provided subject to authorization or permissions of the user. In other words, two users accessing the same custom application may be shown different contents because one is authorized to access more documents or more data than the other. As discussed below, the administrator can apply various customized limitations to further limit the content and functionality accessible through a custom application, to restrict even some content that users are authorized to access.

The custom applications can be generated by the server based on a template or base application framework, which has the positions and function of various predetermined application elements predefined. The administrator can then specify which of the application elements to include, and which functionality to allow or restrict. The server uses the settings from the administrator, saved in configuration data that defines the custom application, to determine which elements and functions to include and which to exclude whenever the server provides a session of the custom application. With the list of elements to be included, the server looks up the modules that implement those elements, and combines them with the template or base application. For example, if the configuration data specifies to include a filter control and search control, but does not indicate to include a data sharing control, the server will (1) retrieve from the module library the current modules that provide the filter control and search control, and (2) combine the retrieved modules with the application template, with the user interface elements placed in e layout positions specified by the template, and with formatting as specified in the configuration data or in the template. The server can have different templates available, and the configuration data can specify which one to use and how to populate the template.

The system can enable an administrator to base a custom application on an existing source document. This technique imports the layout and interactive functionality of existing dashboards, reports, interactive documents. In effect, the system translates content from a document into an application format that combines the interactivity of the document (e.g., links to data sources, interactive visualizations, etc.) with the additional functionality the system makes available for custom applications (e.g., search controls, filter controls, document access, toolbars, etc.). The system provides a wrapper around an existing document, to preserve links to data sources and data sets and interactive functionality of the document, while also optionally limiting the user to the specific functionality and data access that the source document provides (or to a subset of the functionality of the document). The system can extract layout and interactive functionality from the source document, and add additional features for the base application (e.g., search, filter, sort, find, etc.). These features can be built into the application, not relying on the user's web browser, and they can be provided selectively as specified by the administrator. The custom application retains access to the organization's database system and data sets (e.g., OLAP data cubes, tables, etc.) that a source document used, but within limits or restrictions that the administrator defines.

The custom applications can provide a convenient way to access a specific report or data set. Access can be closed to the document(s) or data sets administrator selects, which can allow a limited window to a document, collection of documents, or a data set, potentially with added application features and functionality that the administrator selects from the predetermined set of application features made available by the system. Custom applications can have a purpose built interface, often for a specific target audience or task. For example, an application can provide documents for a particular department, or the financial information for a particular region and time period, but give ability to explore, visualize, and share within the custom application. As another example, an organization can create different applications for different departments or roles, such as to provide the engineering team a different set of features and content than is provided to the accounting team. A custom application can enable sharing among other users of the app. For example, the system can create a version of the document that is shared, where the copy is decoupled from the original document. For example, the system can create a new copy that is a branched or "forked" version of the document, where annotations and changes can optionally be shared among the set of users of the app, but annotations and changes are not propagated back to the original source document.

In some implementations, custom applications are defined by a set of configuration data. This configuration data can include a settings file or a collection of files. The configuration data includes metadata that serves as an application definition. The system makes a predetermined set of features or elements available, and the configuration data includes settings that specify which of the predetermined set of features are provided in the current application. The settings can be specified as a list of features to be included in an custom application, or a setting value for each of the different customizable options (e.g., whether to include or exclude that element). Application elements can have fixed or predetermined settings, such as a predetermined position where the search control is placed, or where the filter control is placed, etc. Optionally, the elements can have customizable properties, with settings values specifying the visual properties and behavior. For example, the system can enable an administrator to specify whether a toolbar is placed on top or bottom of the interface, or to specify the color, size, or other properties. The configuration data can include associated content for the application stored (e.g., images, custom scripts, source documents, custom logos, icons, user interface views, etc.). For example, the system can have a folder or archive that stores a collection of files or other resources as the configuration data for each application, separate from the operative modules (e.g., executable or interpreted code, libraries, etc.).

The system can provide various interfaces for administrators to adjust application properties, such as layout, formatting, and interactivity settings, without coding. Various parameters of application behavior, or even implementing module parameters, can be exposed through the design studio interface. The interface enables a user to specify a consistent theme, formatting, layout, etc. to be used in a custom application, or across multiple custom applications (e.g., to reuse a theme from a stored option). The properties that the administrator specifies can be carried over even as the code and objects of the implementing modules are updated separately. Some settings may be consistent across the entire custom application or the entire set of modules. Some elements may have separate, individually-set settings (e.g., the size of a button, the width of a search bar, etc.) which can be set separately for each application element. The application template, or a particular module itself, can have defaults that are applied unless overwritten. When using a source document as the basis for an application, the settings can be identified or extracted from that document (e.g., font, color, size, etc.), and then re-created in the custom application.

The interface allows consistency across platforms. Settings set in the design studio are reflected in the application definition configuration data, and then are applied for whichever platform the application is requested to be presented on. A single set of configuration settings is translated into the proper code and effect on different platforms. The modules used to implement an application feature on each of various different platforms (e.g., three versions of a search bar for different operating systems) can be configured to each accept the same types of parameters, with the same meaning of the settings value (e.g., 1=red, 2=blue, etc.).

FIG. 1 is a diagram showing an example of a system 100 for developing and deploying custom applications. The system 100 includes a server 110 (e.g., an application server), an administrator device 102, and a client device 130. The server 110 facilitates creation of custom applications, and the server also hosts or serves the custom applications to user devices after the custom applications are created. The server 110 enables an application creation interface that provides administrators the versatility to specify the behavior and appearance of custom applications without writing or computer code. In addition, the application creation interface allows the capabilities of various server functions (e.g., database access, document library access, searching, data filtering, sharing data, etc.) to be selectively activated within each custom application. With these capabilities, different enterprise customers (e.g., different organizations or companies) can easily create custom applications for their own users, leveraging the capabilities of their own server infrastructure (e.g., instances of a server running on premises, in a data center, in a cloud computing platform, etc.).

The server 110 provides functionality to assist administrators to create custom applications that can be provided to various users. The server 110 communicates with the administrator device 102 to enable an administrator 106 to create and edit custom applications that the server 110 will provide to users. For example, the server 110 provides data that the administrator device 102 can use to display an application creation interface 104, which provides the administrator 106 options for creating a new custom application. The interface 104 includes interactive controls that enable the administrator 106 to customize the appearance of the custom application (e.g., layout, formatting, style, color scheme) and the set of functionality available in the custom application (e.g., search, filter, bookmarking, sharing data). For example, the server 110 receives configuration data 108 from the administrator device 102 over network 160. The configuration data 108 can indicate user input to the interface 104 that specifies the appearance and functionality that the administrator 106 specified for the new custom application.

The server 110 also hosts custom applications that are created and serves content of the custom applications for presentation by client devices. The server 110 receives requests from client devices to access custom applications, and in response the server 110 provides user interface data for the requested custom applications. In general, the custom applications generated and served by the server 110 are hosted remotely from the client devices of end users, and the server 110 generates and provides application data for each session of use of a custom application. This is different from the delivery scheme for many other types of applications, which are downloaded once from an application store and installed on a mobile phone or other device, where the installed application resides as a compiled executable. By contrast, the server 110 enables custom applications to be defined through a set of configuration data that specifies the features, settings, content, and other properties to be provided.

When a user requests access to a custom application, the server 110 uses the stored configuration data for the custom application to retrieve and combine the components needed to provide the custom application. For example, the server 110 can identify which application elements or features that the configuration data specifies to be included. The server 110 then retrieves software modules or other components that implement the identified application elements, and combines the retrieved modules into the custom application for delivery to and presentation by the client device that requested access. This technique allows the custom application to be generated "just in time" or dynamically in response to a request.

The technique that the server 110 uses to serve custom applications can provide several significant advantages. For example, when an administrator changes the custom application, and the configuration data stored at the server 110 is updated. The changes to the custom application become effective for all users then next time they access the custom application, without the need to update installed applications at client devices (e.g., through a patch or an application store upgrade package). In addition, the configuration data for the custom application and the modules that implement application elements can be separately and independent updated, while maintaining compatibility. For example, the platform provider may update the modules that implement various application elements (e.g., search controls, toolbars, visualizations, etc.) to improve security, add functionality, improve compatibility, etc. Because the application's appearance and behavior is defined separately from those modules in the configuration data for the custom application, the customized aspects of the custom application are maintained and preserved unaffected even as the implementing modules change. In addition, after modules are updated, the most up-to-date modules are used to provide the custom application for each new session. As a result, each user of the custom application automatically receives the benefit of the upgraded modules, without the need to install updates to client devices one by one. The modules can be shared across multiple custom applications to provide consistency across custom applications and increase efficiency of operations at the server 110.

The ability to define applications through configuration data and to dynamically combine modules to serve the application also improves cross-platform compatibility. For example, the server 110 can store a different set of modules to implement the features for different platforms (e.g., different operating systems, different device types, etc.). When a mobile phone provides a request for a custom application, the server 110 can combine modules specified by the application's configuration data, selecting the modules from among modules designed or optimized for mobile phones. Similarly, when a desktop computer requests the custom application, the server 110 can also combine modules specified by the application's configuration data, but can select the modules from among a set of modules designed or optimized for the desktop computer. In this manner, the server 110 can use the same configuration data to provide the custom application to each of multiple platforms, thus ensuring consistency in the appearance, content, and features presented on the different platform. In addition, the server 110 can use platform-specific modules to implement the custom application for each platform, to maximize compatibility and performance on each platform.

Briefly, the example of FIG. 1 shows an administrator 106 creating a new custom application with the application creation interface 104 (stage (A)). The server 110 then generates configuration data 114 for the custom application to record the content, appearance, and other characteristics to be provided. After the custom application has been created, a client device 130 requests access to the custom application, and the server 110 generates interface data for the custom application based on the stored configuration data 114 and modules in a repository 116 (stage (B)). The server 110 then provides generated interface data 138 to the client device 130, and the client device 130 provides a view of the custom application (stage (C)).

The server 110 may include a single computer or multiple computers operating in conjunction with one another, such as one or more computers of an on-premises server, a data center, a cloud computing platform, etc. The client device 130 can be a computing device, such as a desktop computer, a laptop computer, a tablet computer, or a phone or other mobile computing device.

In the example of FIG. 1, the administrator's device 102, the server 110, and the client device 130 each communicate over a network 160. The network 160 can include a wired or wireless network. The network 160 can include a local area network (LAN), a wide area network (WAN), a mobile network (e.g., 4G, 5G), and/or the Internet.

In further detail, in stage (A), the administrator 106 uses the application creation interface 104 to create a new custom application, and configuration data for the application is stored at the server 110. As illustrated, the administrator device 102 presents application creation interface 104, which can be, for example, the user interface of a standalone application or of a web page or web application provided by the server 110. The application creation interface 104 can include controls (e.g., sliders, toggle buttons, checkboxes, text entry fields, drop-down lists, buttons, etc.) that allow the administrator 106 to define the appearance, content, and behavior of a custom application. The controls can include sliders and/or toggle buttons which specify whether application elements are included in the custom application.

The system provides several options for new applications. One option the interface 104 provides is to start with an existing document (e.g., a report, dossier, dashboard, presentation document) that the administrator 106 selects to serve as an interface of the custom application. The administrator 106 can select an interactive source document, such as dashboard that shows visualizations of data from a database server, and the server 110 can translate or convert the interactive document into a network-accessible custom application that provides the same content, same database access, and same interactive features as the source document. For example, the server 110 can do this by including the interactive document within a base application with existing presentation features (e.g., so the base application acts as a wrapper or shell to contain the source document). As another example, the server 110 can analyze the source document to extract the visual and interactive features, in order to replicate those features in a custom application.

As another option, the interface 104 can enable the administrator 106 to choose to rely on a predetermined interface for the custom application. For example, the server 110 can make available a base application that provides a home screen with a user's document library that is accessible through the server 110 or another server system. In effect, the custom application can be a customized window or access portal for users to access various server-hosted documents or applications, with the additional benefit that the administrator 106 can selectively customize the types of access permitted (e.g., enabling or disabling specific document library features, restricting access to only a specific set of documents, etc.). The interface 104 can make various different application templates or application views available as a starting point for creating a custom application, so the administrator 106 can select from among them. The administrator 106 can then further customize or edit the content of the new application. The administrator 106 can also create different custom applications that potentially have different capabilities or content for different user groups.

In some implementations, the application creation interface 104 can provide controls that enable the administrator 106 to specify whether end users can edit the content provided by the application and/or share edits and annotations made within the custom application. In other words, the interface 104 can be used to set whether interactions of one user within the custom application will be viewable by other users or groups of users that also access the custom application.

In general, when a custom application makes documents from the server 110 or another source available in a custom application, edits or annotations made by users will be saved to the source documents and the files with those changes will be accessible outside the custom application. Nevertheless, in some implementations, a custom application can be created as a shared collaboration space contained within the application. For example, the administrator 106 can create a custom application 106 based on a source document, so that the content and features of the source document serve as at least a part of the user interface of the custom application. The custom application can represent a separate and distinct copy of the source document, however, so that edits and annotations that users make within the custom application are shared within the custom application but are not shared with or propagated back to the source document. In effect, the content of the source document is branched and the custom application is considered a separate and independent set of content. If the same document forms the basis of multiple different custom applications, each custom application can have its own version or copy of the source document's contents. If the content is revised in a first custom application available to a first user group, the revisions will be included when the first custom application is access by another user in the first user group, but the revisions will not be included in a second custom application, even though it was created based on the same original source document.

The application creation interface 104 can include controls to customize the visual design (e.g., layout, color, appearance) of the custom applications. The application creation interface 104 can allow the administrator 106 to upload or insert a custom icon (e.g., logo) into the custom application. The application creation interface 104 can provide controls to apply an existing visual design to a new application. In some implementations, the application creation interface 104 can provide controls to apply a new visual design to an existing application. For example, different applications for different user groups can include the same content and/or set of functionality, but be presented using different visual designs.

In the illustrated example, the interface 104 provides a discrete set of application elements that can included in a custom application. The administrator 106 has selected a subset of the application elements to be included in the custom application (e.g., the toolbar, search control, and table of contents). Other application elements are not selected (e.g., notification functionality and bookmark functionality) and so will be omitted from the custom application.

The administrator device 102 communicates with the server 110 to provide the settings 108 that the administrator 106 specified for the new custom application. For example, the user input that the administrator 106 provided to the interface 104 is provided to the server 110 over the network 160. The server 110 uses the administrator-provided settings 108 to create a set of configuration data 114a that defines the properties of the new custom application. As discussed below and illustrated with respect to FIGS. 3A-3H, the interface 104 can enable the administrator 106 to define many aspects of a custom application, including visual appearance, sets of content that is accessible, selection of application elements provided, authentication protocols used, network settings, and more. Each of the settings 108 that the administrator 106 specifies can be stored in the configuration data 114a. The configuration data 114a can also include other content to be provided through the custom application, such as media (e.g., images, videos, audio), document content, and so on.

The server 110 creates or registers the new custom application by saving the configuration data 114a in the configuration data repository 112. The server 110 can also update other records, such as records of application permissions 126 that specify which users are authorized to access each custom application. The server 110 can also maintain records of each of the custom applications that have been defined and which administrators created them or have access to alter them.

The server 110 can store data used to provide custom applications in one or more repositories (e.g., databases, data stores, file systems, network-attached storage devices). For example, the server 110 can store application configuration data 114 for various custom applications in a configuration data repository 112. The server 110 can also store modules used to implement application elements in a module repository 116. In some implementations, the server 110 can include the data repository 112 and/or the module repository 116 (e.g., the server 110 and repositories 112, 116 can be provided in the same on-premises server or the same cloud computing environment). In some implementations, the data repository 112 and/or module repository 116 can be located remotely from the server 110 (e.g., at a separate, remote server system).

For each custom application that has been defined, the server 110 stores a corresponding set of configuration data 114 that specifies a set of application elements to provide in the custom application. The interface 104 can limit the aspects that can be customized so that an administrator 106 can select whether to include or omit each of a predetermined set of application elements. The set of configuration data 114 for a custom application then specifies which elements, from among the set of predetermined elements, should be included. For example, the configuration data 114a can specify the set of application elements that the administrator 106 selected during the creation of the custom application. The configuration data 114a can include a list of identifiers for application features selected to be included (e.g., identifiers for the toolbar, search control, and table of contents). As another example, the configuration data 114a can be generated to include, for each of the application elements in the predetermined set of application elements available, a value that indicates whether the application element is included in the custom application (e.g., "1" for the toolbar, "1" for the search control, "0" for the notification functionality, etc.).

In addition to specifying which application elements are provided in a custom application, the configuration data 114a can specify various properties or characteristics of the elements. For example, if an element is configured to operate over a range of values (e.g., a filter control with a date range, a slider to select a value in a range, etc.), the interface 104 can enable the administrator to set the allowable range, and the configuration data 114a can specify the range of values available for a user of the custom application to select using the corresponding application element.

The configuration data repository 112 can include a set of configuration data 114 for each of multiple different custom applications that have been defined. Typically, each server system stores and hosts custom applications for its own set of users. For example, the server 110 may be a server for a particular company, and the server 110 can store and host custom applications for registered users of the company, with the custom applications using the database system of the company. Other companies would have their own servers (e.g., different instances of cloud computing server environments) for their own users and custom applications. The server 110 can store a different set of configuration data 114 for each of multiple custom applications. Different sets of configuration data 114 can specify different sets of application elements to be included, as well as other different characteristics (e.g., different visual themes and styles, different content made available, and so on).

The server 110 uses a module repository 116 that stores modules that are used to implement the respective application elements. The modules can include various types of contents, such as software, scripts, settings, mark-up language content, and so on. The modules can represent various user interface elements or types of application functionality that administrators can select to include in custom applications. For example, there can be a separate module for each of the application elements shown in the interface 104 (e.g., a separate module for each of the toolbar, the search control, the notification functionality, the table of contents, and the bookmark functionality). The server 110 can use a subset of the modules to provide a desired subset of application elements in a custom application. The modules can be updated after custom applications are created. In addition, the configuration data 114a for a custom application and the modules used to implement the application can be independently updated.

The module repository 116 can store different sets of modules for different platforms. For example, the module repository 116 includes (1) a set of web modules 118 to implement custom applications for presentation in a web browser, (2) a set of mobile modules 120 to implement custom applications for presentation on mobile devices, and (3) a set of desktop modules 122 to implement custom applications for presentation on desktop computers. To provide the custom application for a particular platform (e.g., a mobile device), the server 110 can use a combination of the modules that are designated for the particular platform (e.g., mobile modules 120). Each set of modules 118, 120, 122 can include a module for each application element available to be presented in custom applications. For example, each set of modules 118, 120, 122 can include a toolbar module, each set of modules 118, 120, 122 can include a search module, and so on. The modules in each set can be updated separately as needed to provide effective functionality on each platform. For example, the example shows that for the table of contents functionality, each set of modules 118, 120, 122 has a different version (e.g., version 1.8 for web browsers, version 1.3 for mobile devices, and version 2.1 for desktop computers).

The module repository 116 can store a mapping 124 that indicates the relationships between settings in the configuration data 114 and the modules in the module repository 116. The mapping 124 includes data that translates between identifiers for application elements and identifiers for modules. For example, the mapping 124 can indicate, for each of the application elements available for custom applications, which module(s) in the module repository 116 can implement the application element. As an example, the mapping 124 can include a table with application element identifiers in a first column, and module identifiers (e.g., codes, file names, etc.) in a second column. The mapping 124 of settings to modules allows the server 110 to quickly and efficiently identify and retrieve the modules that will provide the application features specified by application configuration data 114. The server 110 can update the mapping 124 when modules in the module repository 116 are updated (e.g., added, removed, replaced with a newer version). By updating the mapping 124, the server 110 will then use the modules specified to provide custom applications, without requiring any modifications to the application configuration data 114.

In stage (B), after the custom application has been created, a user can request and receive access to the custom application through the server 110. The server 110 receives requests for custom applications from client devices over network 160.

In the example, the client device 130 initially displays a selection interface 132*a* that lists a set of applications that the user 134 is authorized to access. The server 110 uses the application permissions 126 to track the authorization for each user, and so can provide interface data for the interface 132*a*, which shows that the user 134 is has permissions to access three custom applications, Application A, Application B, and Application C. The interface 132*a* can be a landing page shown in a web browser, such as a home screen or a splash screen. As another example, the interface 132*a* can be a view of a native application or agent on the client device 130, or the interface 132*a* may even be embedded within a third-party web page. The selection interface 132*a* can be provided at other times, such as when the user 134 launches an application viewer, or when a selected custom application is not available for display. In some implementations, the client device 130 can receive the user interface data for the application web interface 132*a* from the server 110 (e.g., before transmitting a request 136 for Application A). The application web interface 132*a* can list all the applications that are available to the user 134, with controls for initiating access to the custom applications.

In the example, the user 134 select application A from the interface 132*a*, and Application A is the application that the administrator 106 created. Because the custom application is network-based (e.g., hosted and served by the server 110 or another server), a user 134 can initiate access to a custom application by clicking on a link (e.g., a hyperlink in a webpage, in an email, in a document, etc.). This provides significant flexibility and versatility of access for users, since each custom application does not need to be separately installed in advance. The client device 130 transmits the request 136 for Application A to the server 110 over the network 160 in response to the selection of application A by the user 134.

In response to receiving the request 136 to access Application A, the server 110 processes the request 136. The server 110 can access the records of application permissions 126 to determine whether the requesting user 134 is authorized to access the application. The server 110 can require the user 134 to login before receiving access to the custom applications. The server 110 can determine whether a user of the client device has permission to access the custom application by authenticating the user of the client device 130. For example, the server 110 receives the request 136 for Application A from client device 130 and authenticates the user 134, e.g., by verifying the identity of the user 134 with a password or other credential.

The server 110 also uses the application permissions 126 to determine whether the user 134 is authorized to access the specific application requested. The application permissions 126 can specify specific users that are authorized for each application. The application permissions 126 can additionally or alternatively specify groups of users that are authorized to access applications. The server 110 can then check whether the user 134 is specifically authorized, or is in a group that is authorized, to access the requested Application A. When an application is created, the interface 104 can provide controls that enable the administrator 106 to specify the users and/or groups of users authorized for access, and access can also be added or removed for an application at a later time.

In many cases, the server 110 generates the data for the interface 132*a* based on the application permissions, so the list in the interface 132*a* shows only the applications that the user 134 has access to view. Nevertheless, if the user 134 does not have permission to access a requested application, the server 110 can redirect the user to a different application or to the selection interface 132*a*. For example, the server 110 can use the techniques of FIGS. 2A-2C to provide data for an alternative interface. For example, the alternative interface can include a notice (e.g., indicating that the user 134 is not authorized to access application A), can provide a selection interface for the user 134 to select among applications that the user 134 does have authorization to access, or can provide the most similar application that the user 134 does have access to view.

In some implementations, the server 110 can determine that the a request 136 for Application A is for a web application. For example, the server 110 can determine that the request originated from a web browser on client device 130.

The server 110 accesses configuration data in response to receiving a request for an application (140). The server 110 accesses application A configuration data 114*a* from configuration data repository 112. The Application A configuration data 114*a* includes a value of "1" for toolbar, search, and table of contents (TOC) elements that specifies that the elements should be included in application A. The Application A configuration data 114*a* includes a value of "0" for notifications and bookmarks elements that specifies that the elements should not be included in application.

The server 110 determines modules required for the requested custom application (142). For example, the server 110 can determine to use web modules 118 based on receiving a request for a web version of a custom application. The server 110 accesses web toolbar module 118*a*, web search module 118*b*, web TOC module 118*c* corresponding to the elements specified in the Application A configuration data 114*a*.

The server 110 generates application interface data use the required modules (144). The server 110 generates the user interface data using modules from the repository that correspond to the application elements specified in the configuration data. The server 110 generates the user interface data such that the user interface date includes the modules from the repository that correspond to the application elements included in the subset, and omits modules from the repository that correspond to the application elements that are not included in the subset. The user interface data can specify at least one of a layout, formatting, or media used to present the view of the custom application. For example the user interface data can specify a custom look and feel of the application (e.g., an icon in a corner, a customized color scheme).

The server 110 accesses an application template 150*a* with application A content corresponding to application A configuration data 114*a*. The application template 150*a* with application A content includes content received from administrator device 102 when the custom application was created. The server 110 creates the application A by combining the application template 150*a* with application A content and the modules required for the requested custom application.

In stage (C), the server 110 provides the generated application interface data (146) for Application A to the client device 130 over the network 160. The server 110 provides user interface data for custom applications to client devices over the network 160 in response to receiving the request. The server 110 can transmits application A interface data 138 based on receiving the a request 136 for Application A.

When an application corresponding to system 100 is launched, the client device 130 can determine whether the user 134 is logged in. If the user 134 is not logged in, the client device 130 can request for the user to log in. the client device 130 can check user permissions when user 134 tries to perform an action corresponding to system 100 (e.g., requesting a custom application). The client device 130 provides a view of the application A 132*b* based on receiving application A interface data 138. The user 134 can view the content and interact with Application A, which is presented according to the specifications that were set in the configuration data 114*a*.

FIGS. 2A-2C are diagrams showing different examples for redirecting requests for custom applications. The server 110 can process requests for custom applications and handle requests differently in different situations. For example, when the server 110 receives a request to access a custom application, the server 110 can determine whether the custom application is available and authorized for the user, and if not, the server 110 can initiate a redirect to a different resource.

One of the advantages of the network-based applications provided by the server 110 is that access to the applications can be initiated through a simple reference, such as a URL or hyperlink. As a result, a control providing access to a custom application can be easily inserted into a web page, a web application, a native application, an interactive document, and so on. In some cases, a user may click a link for an application that is not available, for example, because the user is not authorized to access the application or because the application is no longer provided (e.g., the version has been upgraded, or the application has been removed). The server 110 has various techniques by which it can optimize behavior for redirection when users attempt access to an application that is not authorized for the user or is unavailable.

For example, in response to an application access request, the server 110 can determine whether configuration data corresponding to the request application is stored in a repository and/or whether the user has permission to access the requested application. If a requested application is not available, the server 110 can provide different user interface data to the client device. In each of the examples of FIGS. 2A-2C, the user 134 has initiated a request for Application A, such as by interacting with a hyperlink, desktop icon, or other reference to the application. The same techniques can be used to process requests for any of the various custom applications that the server 110 provides.

FIG. 2A is a diagram showing an example of automatically responding to a request for a first application, which the user does not have authorization to access, by providing a different, second application that the user does have permission to access. As discussed above, the server 110 stores application permissions 126 that indicate which users are permitted to access each of the various custom applications that have been created using, or are registered with, the server 110. When an application selection interface 132*a* is provided, the server 110 generally uses the application permissions 126 to limit the list of application options to the subset of applications that the particular user is authorized to access. As a result, the user 134 typically sees only options for the applications that are currently available from the server 110 and for which the particular user 134 is authorized to access. Nevertheless, in some cases, links to custom applications may be places in third-party interfaces, such as web pages, that the server 110 does not influence, and so a user may encounter links for applications that the user 134 does not have authorization to access. When the user clicks such a link, the server 110 can detect that the user 134 is not authorized and can instead provide another application, selected from among the set of custom applications for which the user is authorized to access. This provides continuity to the user and makes links useful for the user, even if the user has been deauthorized, or has not yet been authorized, for the particular application indicated in the link. In other words, a link to any application provided by the server 110, even for an application that the user is not authorized to access, can provide an entry point to access an application that the user is authorized to access.

For example, the client device 130 can receive a selection of application A in the application web interface 132*a* and transmit the application A request 236*a*. The server 110 receives the request 236*a* for Application A from the client device 130 and, in response, determines whether the requested application is available. For example, the request 236*a* can include an application identifier, and the server 110 can check whether there is a custom application registered for that identifier and whether there is a corresponding set of configuration data 114 for the custom application in the configuration data repository 112. In the example of FIG. 2A, the server 110 determines that the requested application is available.

The server 110 also determines whether the user 134 of the client device 130 has permission to access the requested application. The user 134 can be required to authenticate, such as by logging in and providing a password, code, authentication token, etc., or by using a single sign on (SSO) service or other authentication technique. The server 110 then uses the stored application permissions 126 to determine whether the authenticated user 134 is authorized to access the requested application. In the example of FIG. 2A, the server 110 determines that the user 134 does not have permission to access the requested application. In response to determining that the user 134 of the client device 130 does not have permission to access the requested application, the server 110 determines whether the user 134 has permission to access another application the server 110 provides.

If there are multiple applications the user 134 has authorization to access, the server 110 can select among them. In some implementations, the server 110 can provide a default application, or one that the user 134 has indicated to be a preferred application in a preference or setting set by the user 134. In other implementations, the server 110 can select an application that the user 134 accessed most frequently (e.g., the greatest number of times, or an application that the user 134 has accessed most recently. In some implementations, the server 110 can select, from among the applications that the user 134 has permission to access, the application that is most similar to the requested application (e.g., based on content of the applications, based on the documents or data sources used, based on the topics or keywords of content or metadata of the applications, based on the degree of overlap in the set of users or user groups authorized to access the applications). In the example, the server 110 selects Application B as the application that is most similar to the requested Application A from among a set of custom applications that the user 134 has authorization to access.

The server 110 generates interface data for Application B, and provides application B interface data 238a to the client device 130. The client device 130 provides a view of the application B 232a based on the received application B interface data 238a. The user 134 can view the content and interact with the application elements of the application B.

FIG. 2B is a diagram showing an example of automatically redirecting a request for a first version of an application to a different version of the application, such as to an updated version of the application. In the example, the client device 130 receive a user input that selects application A in the application web interface 132a. The client device 130 transmits the request 236b for version 1.1 ("V1.1") of application A. The server 110 receives the request 236b from the client device 130 and determines whether the requested application is available. In the example of FIG. 2B, the server 110 determines that the requested application is not available.

In response to determining that the requested version of the custom application is not available, the server 110 determines whether a newer version of the custom application is available or if the application has been superseded by a different application. To facilitate this type of determination, the server 110 can store a table or other data structure that tracks the version changes in applications, as well as any changes in application name, application identifiers, replacing one application with a different one, and so on. In the example of FIG. 2B, the server 110 determines that a newer version of the custom application is available. For example, the server 110 determines that configuration data 114 corresponding to the newer version of the custom application is available in the repository 112 or that the newer version is listed in a custom application registry maintained by the server 110. The server 110 also determines that the user 134 of the client device 130 has permission to access the newer version of the custom application.

The server 110 generates interface data for the newer version of the custom application, and provides user interface data for the newer version of the custom application (e.g., application A V1.3 interface data 238b) to the client device 130. The client device 130 provides a view of the application A 232b based on receiving application A V1.3 interface data 238b. The user 134 can view the content and interact with the application elements of the application A.

FIG. 2C is a diagram showing an example of redirecting a request to an application selection page. The client device 130 can receive a selection of application A (e.g., the user 134 can click on a link for application A) and transmit the request 236c. The server 110 receives the request 236c from the client device 130 and determines whether the requested application is available. In the example of FIG. 2C, the server 110 determines that the requested application is not available (and no newer version or replacement application is available either). The server 110 redirects the user 134 to an application selection page for applications available to the user 134. The server 110 provides user interface data 238c for a selection page to the client device 130 over the network. The user interface data 238c for the selection page can allow the user 134 of the client device to select a custom application from among a list of custom applications. In some implementations, the server 110 provides controls to access custom applications that the user has permission to access. In such implementations, the interface data 238c provided to the client device 130 can include a list of accessible applications and controls which allow the user to select from the list of accessible applications.

In some implementations, users can be redirected to an application selection interface when a requested application is unavailable or if the user simply is not authorized to access an application that is available. This provides a quick and effective technique for users to access applications, as each application control (e.g., link, icon, or button) can serve multiple functions. While the primary function can be to provide the specific application identified by the link or button, the server 110 handles requests so that each application control also serves the secondary function of providing an entry point, for any user registered with the server 110, for any of the custom applications the server 110 provides, with each user being shown a customized application interface that has the listed applications customized for the permissions of the user specified in the application permissions 126.

FIGS. 3A-3H are diagrams illustrating examples of user interfaces for designing a custom application. The settings and options entered through the user interfaces are saved in configuration data (e.g., application definition data) for the custom application. For example, the state of the various controls discussed (e.g., information about which checkboxes are checked, which sliders are on and which are off, the values in text fields, the selections in drop-down menus, and content items selected to be included, etc.) can be represented as values or entries in the configuration data. As a result, when the custom application is provided by a server, the application data is generated to have the features and behavior set by the administrator.

Figure 3A:
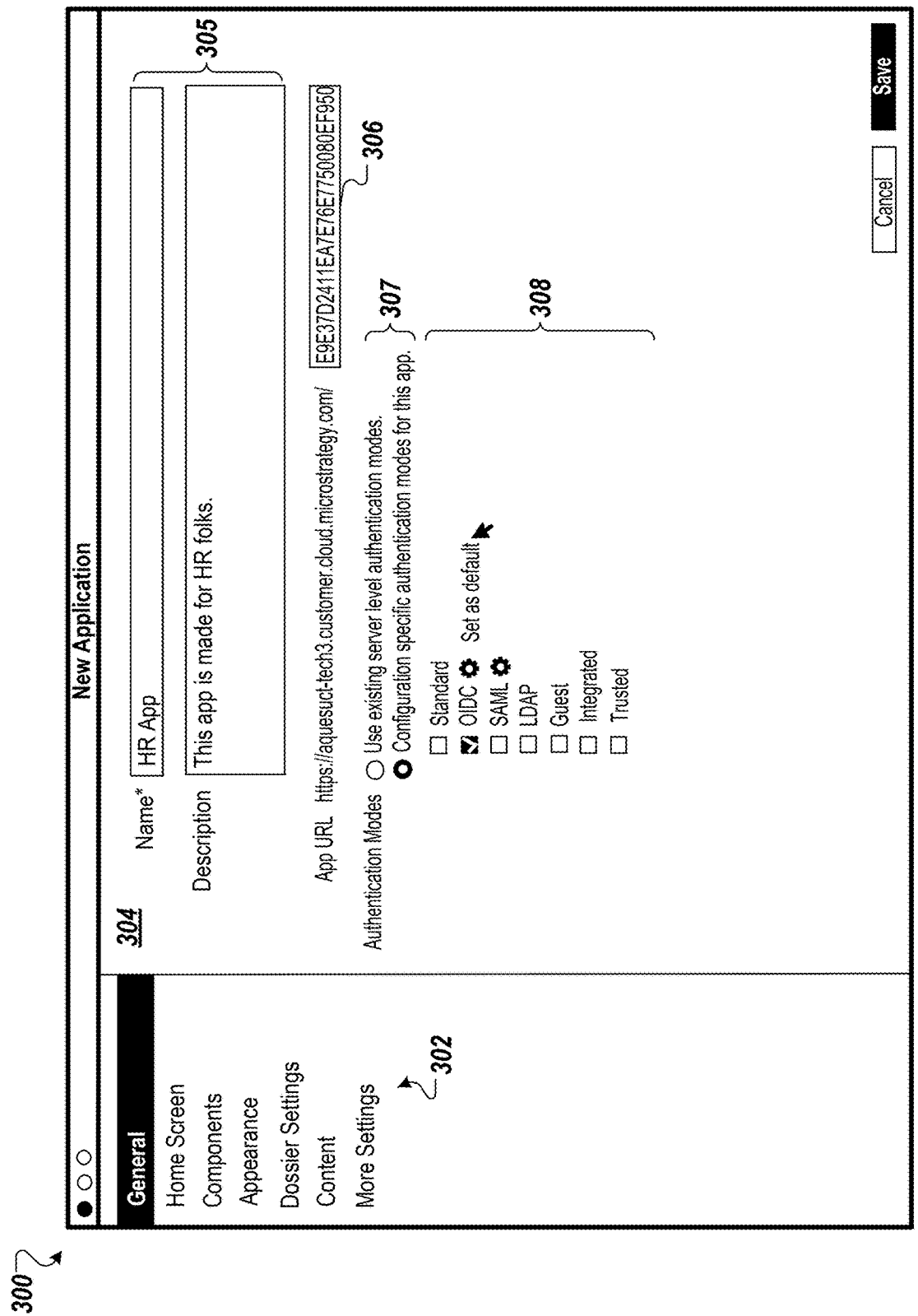
FIGS. 3A-3H are diagrams illustrating examples of user interfaces for designing a custom application.

FIG. 3A shows an example of a user interface that can be provided for administrators to create or edit custom applications. For example, the user interface 300 can be provided as the application creation interface 104 of FIG. 1.

The user interface 300 has multiple tabs that include controls for setting the content and behavior of the custom application. The user interface 300 includes a navigation sidebar 302 that lists the tabs that are available.

The user interface 300 includes a general tab 304 that allows the administrator to set general behavior for the application. For example, the general tab 304 includes text fields 305 to specify a name and description for the application. The general tab 304 includes another field 306 that can be used to specify at least a portion of a URL for the custom application. This URL can be used to access the application after is created, from any of various different platforms, such as a desktop computer, a web browser, and so on.

As shown in control 306, each custom application can have its own URL that is used to access the application. Each custom application can include an application identifier, which can be the same as or different from the entry in the field of control 306. As discussed above, the application can be accessed using the URL from any of various sources, such as a hyperlink in an email, a web page, a native application, a desktop icon or shortcut, etc.

In some implementations, the custom applications are made available through application programming interface (API) keys. A different API key can be defined for each custom application. The application can then be accessible through an API function that provides the appropriate key. Using the API key, the custom applications can be made available as embedded elements of third-party interfaces. For example, after defining a custom application, an administrator may use the API key and an API supported by the server 110 to embed the custom application into another web page or web application. As another example, the API key and other API functions can be used to invoke specific functions or aspects of custom application. The API key can be used to support a number of other management functions. For example, the system can enable functions to enable or disable access to an application based on the API key, or to add greater content access or to reduce content access through functions that specify the API key. These features can be useful to automatically run custom applications for testing, to run periodic performance tests, to interface with other interface to adjust user permissions for each application, and so on.

The general tab 304 includes controls to select different types of authentication. For example, the controls 307 enable the administrator to select between using the existing server level authentication modes or configuring specific authentication modes for the application. Controls 308 enable the administrator to select from among the supported authentication modes and allow as many as our desired to be used. The controls 307 provide the administrator flexibility to use the current or default settings of the server, so that the server's authentication preferences are propagated or carried through to the current application. The administrator can also set the desired set of authentication options manually as shown in controls 308. The custom application can be configured to support any of various different authentication schemes for different systems. Although the links or buttons for different applications may appear to be similar, one may be configured to use a particular SSO for authentication, while another may be configured to use Security Assertion Markup Language (SAML).

After the general tab 304, the user interface 300 has a home screen tab (not shown). The home screen tab enables the administrator to select the initial view or screen of the application. For example, the administrator can select an existing document (e.g., a dashboard, a report, a web document, etc.) To use as the initial view of the application. Alternatively, the administrator interface can allow the administrator to select a view or interface provided by the system, such as a library window view that shows a user of the custom application his or her document collection available from the server. Other types of interfaces generated by the server can also be presented as options for the home screen.

Figure 3B:
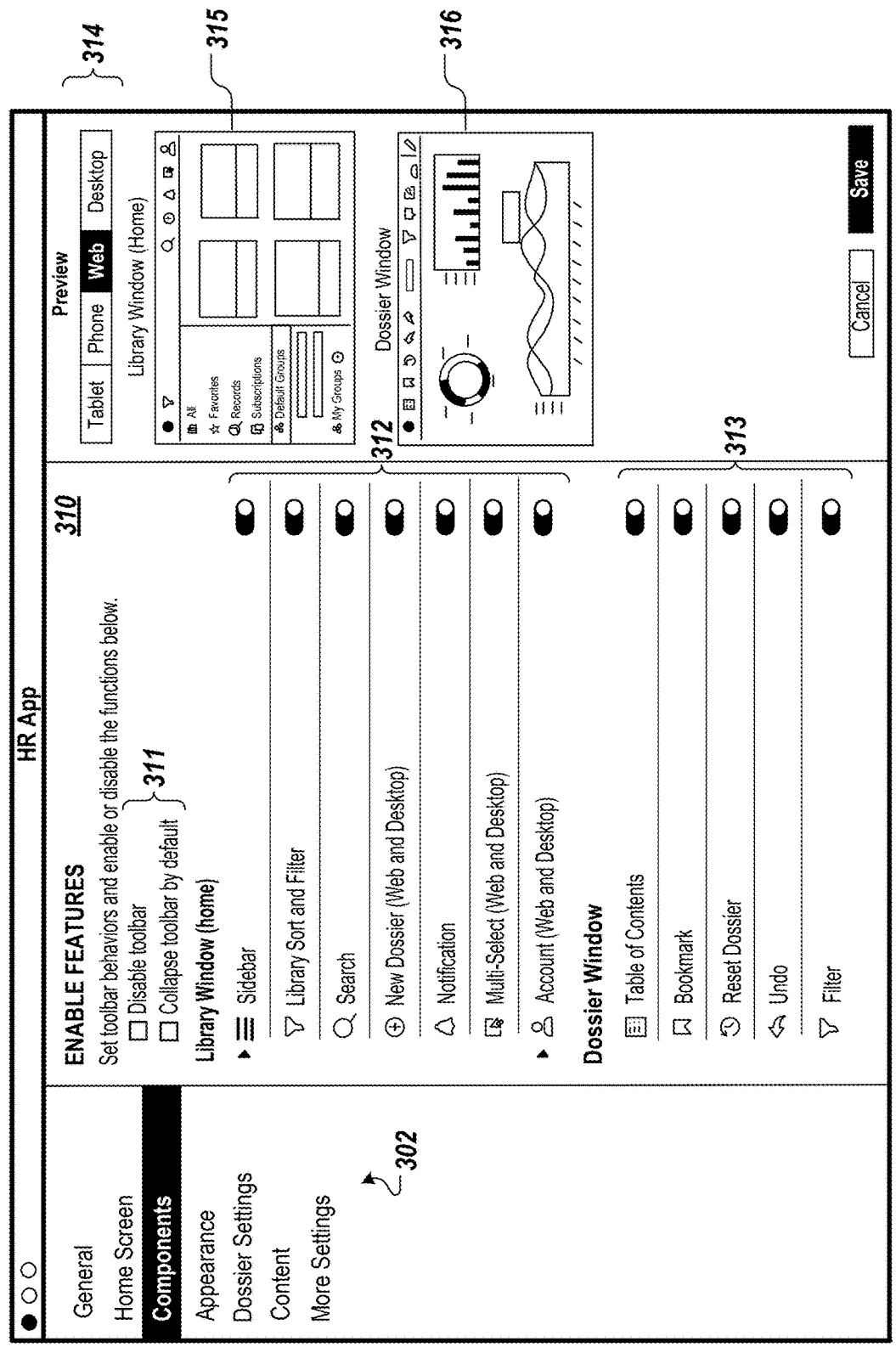

FIG. 3B shows a components tab 310 of the user interface 300 the components tab 310 includes controls that allow the administrator to customize which application features are provided in the custom application. This can include specifying which of various user interface elements are presented (e.g., which buttons, text entry fields, and other interactive controls are included). By interacting with the various controls in the tab 310, the administrator can select to include or omit different application features from view in the custom application.

The tabs return includes toolbar controls 311 that give the administrator the option to disable a toolbar (e.g., omit the toolbar and not allow it to be used) or to collapse the toolbar by default (e.g., show the toolbar and allow it to be used, but also automatically hide the toolbar to save space when not used). The default behavior in this example is to present the toolbar with various controls unless the administrator selects in the controls 311 not to.

The controls 312 allows the administrator to enable or disable each of a predetermined set of features for the library window view in the custom application. In the template 150 for an application, layout and positioning for the various features can be defined, so that Annie or all of the features can be presented together in an application. Nevertheless, the controls 312 allow the administrator to selectively enable or disable each feature, to cause the corresponding element to be shown or removed in the resulting custom app. One of the benefits of the system is that it allows the administrator to define purpose-built custom applications that are tailored for the specific use cases or needs of a target group of individuals. Accordingly, one custom app may be defined for a group that needs functionality to search, filter, issue or receive notifications, and so on while a second custom app for a second group of recipients may not need any of those features and a simple dashboard status view maybe sufficient for the objective or purpose of the application.

The controls 312 include controls to specify whether or not to include a sidebar, a library sort and filter control, a search control, a new document control, a notification control, to permit multi-selection (e.g., enable the user to concurrently select multiple files or other items), or to access account information and preferences through the application.

The components tab 310 also includes a set of controls 313 that enable the administrator to selectively include or omit features for a dossier window view. In the example, a dossier is a multi-page document with interactive features. The controls 313 enable the administrator to independently set the set of features presented or allowed for view of this document then this set of features used for the library view. As a few examples, the controls 313 can enable the administrator to specify whether to present a table of contents, bookmark tool, a reset dossier control, and undo control, a filter control, and so on.

The components tab 310 also includes a sidebar on the right that shows previews of the views that result from the selections within the components tab 310. The previews include a library window view 315 and a dossier window view 316. In response to interactions with the controls 312, 313, the system updates the appearance of these preview areas 315, 316. For example, if the administrator clicks to deselect the search control in the library controls 312, the search button will be removed from the library window preview 315.

The preview area also includes platform selection controls 314 that enable the administrator to select one of multiple platforms for the previews. The preview controls 314 show four different platforms, tablet computer, phone, web page, and desktop computer. The custom application being designed can be accessible through the server to any or all of these platforms. The controls 314 allow the administrator to select one of the platforms and see a preview of the appearance of each view type of the application (e.g., library view 315 and dossier window view 316) for the selected platform. As a result, the administrator can select each platform type in turn and see how the user interface of the custom application will appear on each platform.

Figures 1, 3C:
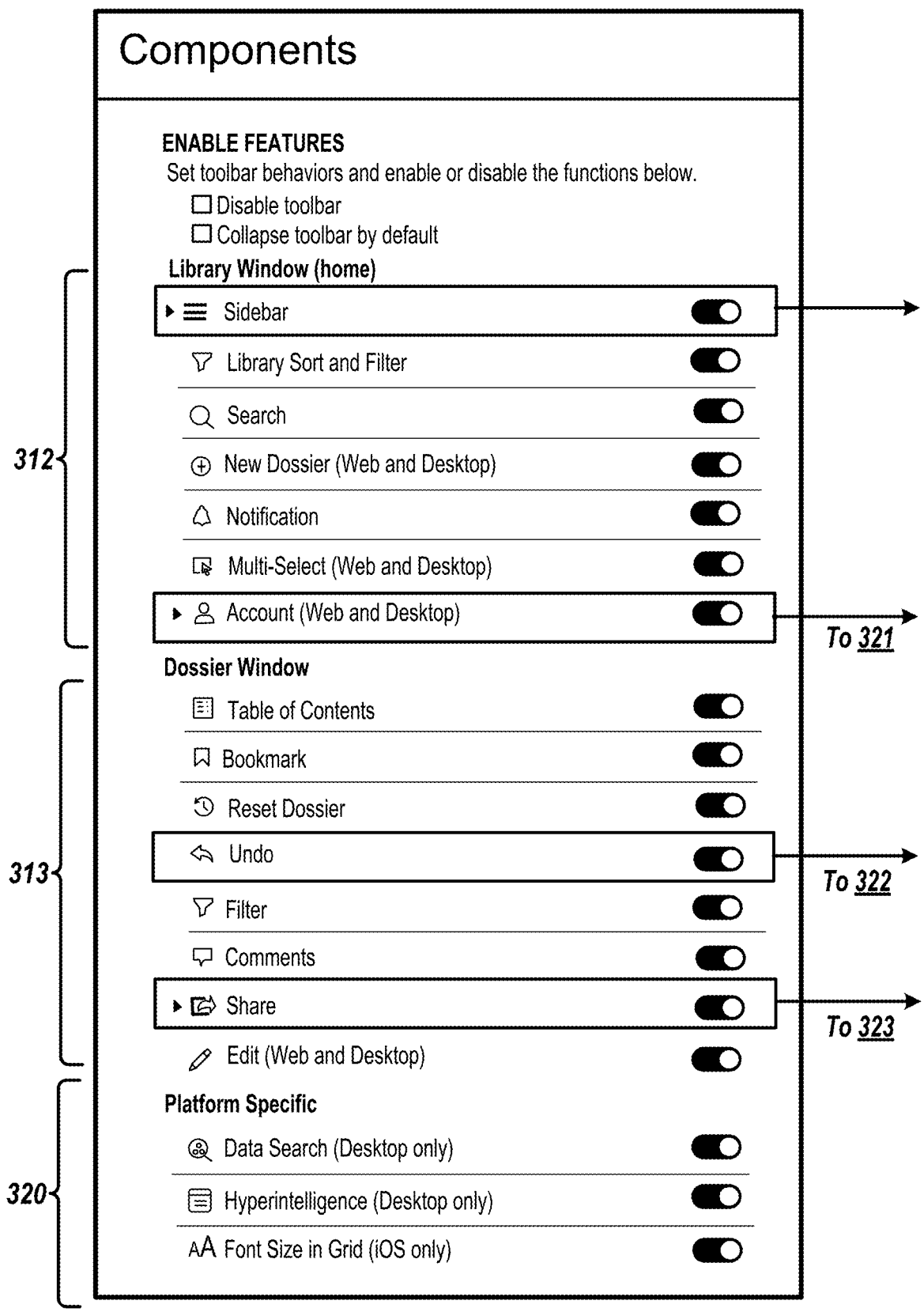
Figures 3, 3C:
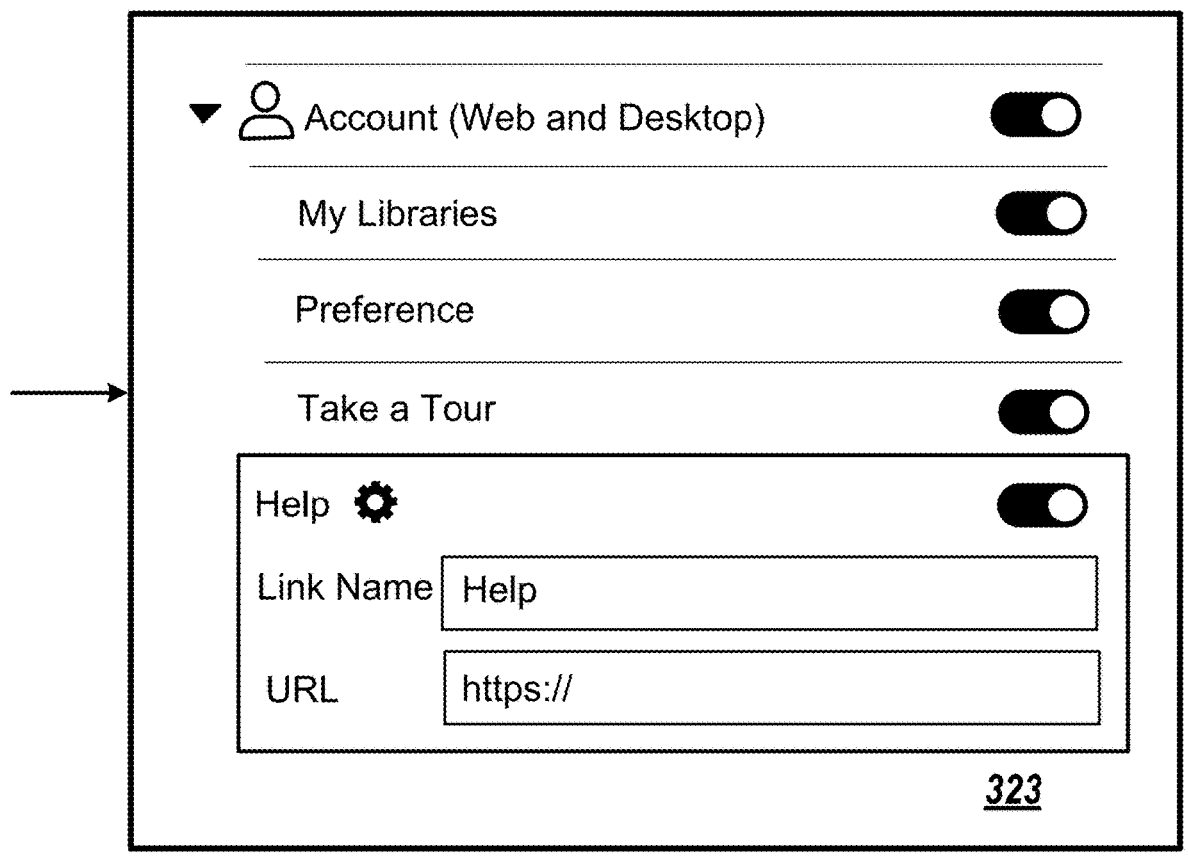

FIG. 3C shows an expanded set of the controls that can be made available through the components tab 310. The set includes the controls 312 for the library view and the controls 313 to specify components to include for the dossier window view. In addition, the example shows additional controls 320 that can specify platform-specific components or behavior. For example, enhanced data search features may be available through the desktop platform but not others. As another example, a platform that perform semantic analysis and contextual analysis to surface relevant database content may be made available, but may also be available only through one or more of the platforms. As another example, certain layout or formatting features maybe available through one platform or another or through one operating system or another. The example also shows additional controls 321 showing how the administrator can customize the content and/or behavior of a sidebar. For example, the controls 321 allow the administrator to include or exclude features for a library, personalized content, favorites, recently viewed information or pages, subscriptions, downloads, default groups, personalized groups, and account information.

The example also shows controls 322 that allow the administrator to specify which of a predetermined set of account management features are accessible through the custom application. For example, the controls 322 can specify whether account information can be accessed or specified at all, whether the user's personal libraries can be viewed, whether user preferences can be viewed and specified, whether a tour of the custom application is made available, whether a help option is available, and whether a log out button is included.

The example shows that the help system can enable access to a website that presents the help content. For example, the set of controls 323 enable these are to specify a link name, and URL or other reference to access particular help items.

The example also shows sharing controls 324 that customize what options or elements are presented for sharing content from the custom application. The controls 324 include those to specify whether to include or exclude a sharing control, as well as to include or exclude features to share a dossier, export data to Excel spreadsheets, to export data or views to PDF documents, to allow download of the dossier in the application, or to subscribe to the dossier to receive notifications, updates, and changes.

Figure 3D:
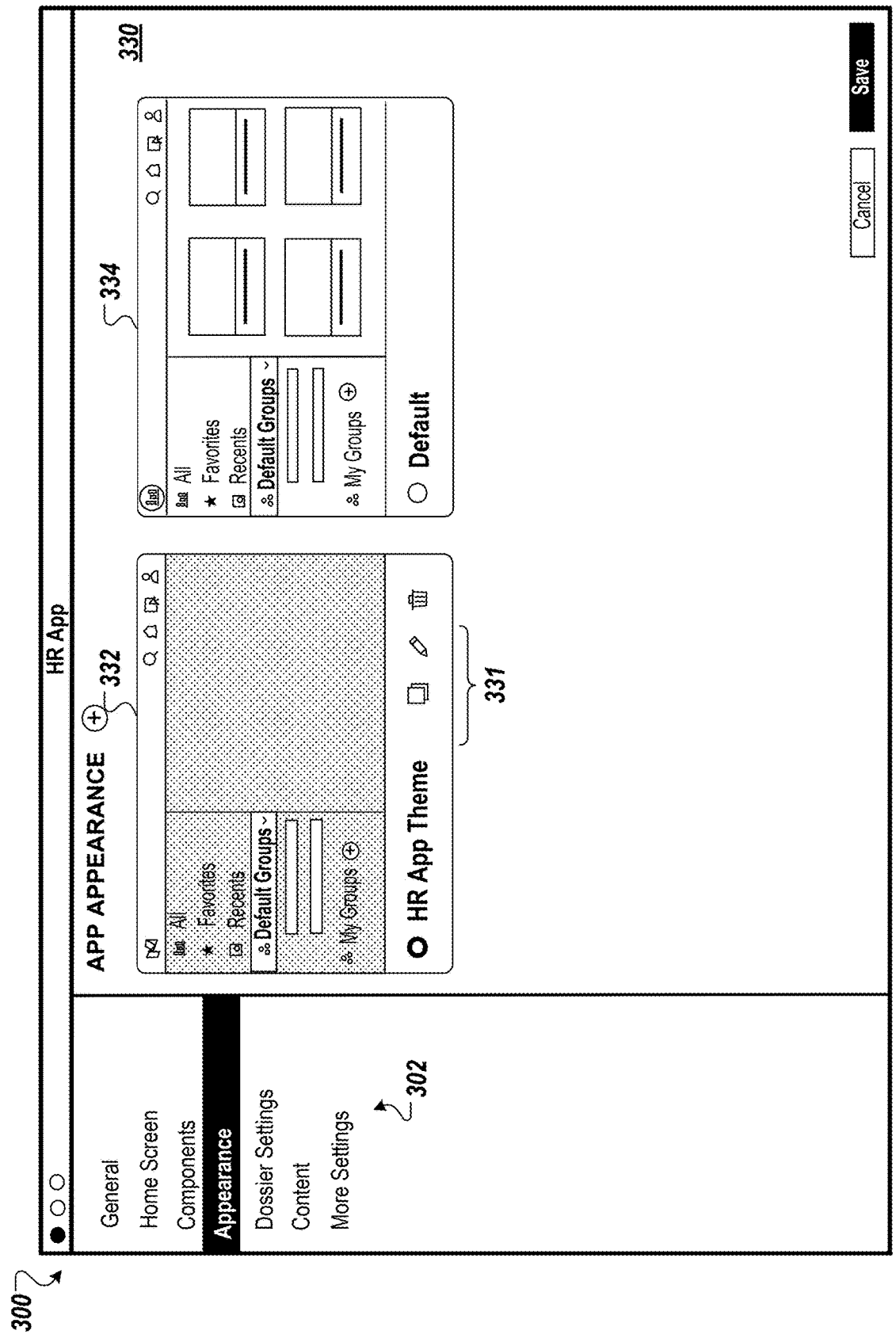

FIG. 3D shows an appearance tab 330 that enables the administrator to specify the visual characteristics that will be used throughout the custom application. To keep the appearance of different views consistent within the custom application, a visual theme or style can be applied. As a result, headings, body text, icons, and other properties can be specified by a selected theme and use consistently across multiple pages or views within the custom application. In the example, the appearance tab 330 shows multiple themes 332, 334 from which the administrator can select a theme for the custom application. The appearance tab 330 includes controls 331 that respectively enable the administrator to copy, edit, or delete the theme 332. An example of features that can be used to edit or create a theme is shown in FIG. 3E.

Figure 3E:
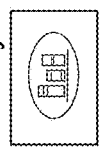

FIG. 3E is an example of a tool set or interface view 335 that includes features for defining a visual theme. The theme that is created can be applied to a single application, or to multiple custom applications so that visual characteristics are shared by multiple applications. In the example, the view 335 includes controls 336 to specify the logo to be used for various features, such as a library web interface, a library favorite icon, any library mobile icon. Images or other content can be specified or uploaded for other types of buttons or controls, as well as splash screens, toolbars, and other visual elements. The control 337 enables the administrator to specify an accent color, such as a color for borders, icons, buttons, links, and more. In other options, a control 338 allows the administrator to specify a font for text. The view 335 can also include controls to specify other text properties, such as size, style, justification, and more. The control 339 allows the administrator to specify a background color, such as to select from among multiple options with a dropdown list control or to otherwise specified desired color or background image. The control 340 allows the administrator to specify which types of views are enabled or are adjusted using the theme. For example, the theme can be applied to both the library view and other views that the system generates, as well as views based on dossiers and other documents that are provided by the administrator and then translated or converted into the custom application format.

Figure 3F:
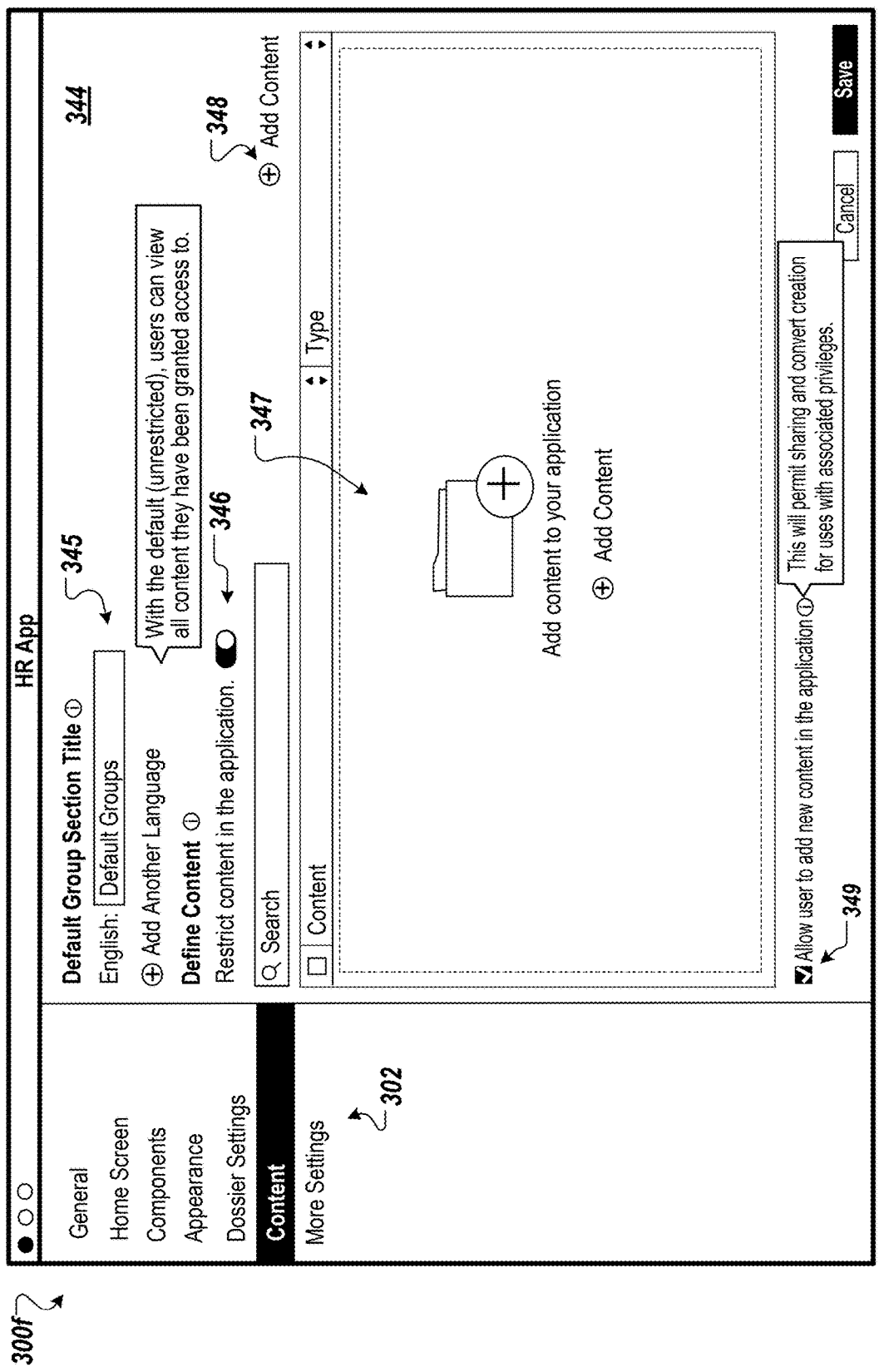

FIG. 3F is an example of a content tab 344 that enables the administrator to specify the set of content available to others through the custom application.

The control 345 enables the administrator to specify languages supported as well as groups in the system that are supported. For example, the controls in the content tab 344 enable the administrator to restrict access to a specific set of content, allow access to certain types of content, specify whether users can add or edit content, and so on. A custom application can be designed to present a limited, predetermined set of views or interfaces, or can be left more open for users to access a broader range of documents from their own libraries, or from third party sources. The custom application can also be configured to limit the sets of documents, data, and other content that are accessible within the various views of the custom application.

The content tab 344 includes language controls 345 that enable the administrator to specify which languages are supported in the custom application and which groups of users are provided content in each language. In the example, a single language, English, is supported, and the default user group is shown to receive English content. Nevertheless, there is a control to add another language, and administrator can use the controls 345 to enable support for multiple languages and to assign different groups of users to receive content or interfaces in different languages.

The content tab 344 also includes a control 346 enabling the administrator to choose whether or not to restrict the content accessible through the custom application being created. The overall system automatically enforces the security policies and permissions of the server, and so users are always only able to receive and view content that they have permission to access. Access. However, the controls in the content tab 344 enable an administrator to create the application to restrict users to a subset of the content that they are authorized to view. For example, the administrator may desire to create a custom application for a specific purpose or a specific set of users where the custom application has a specific set of views or workflows, rather than permitting open-ended document access and editing. In some cases, the default option is for users to be able to view all content that they are authorized to access. By enabling the control 346, however, the administrator can restrict access through the custom application to only specified content items or types of content.

When the administrator restricts the content available through the custom application, the administrator, can you use the controls 347, 348 to specify the content that will be made accessible through the custom application. For example, the control 348 can be used to open a file selection interface to select documents, files, media, and other content. The control 347 is an area configured to show a list of content that has been added for the application, along with information about each item of content, such as a type of content, a date created or modified, a user or department that created or owns the item, a size, and so on. The control 347 also serves as a drop target for users to drag and drop content items to the control 347 to add the items.

The content tab 344 also includes a control 349 for the administrator to specify whether users are permitted to add content in the application. For example, a user may want to create a new document within the custom application, or may desire to upload or otherwise enter in external files, documents, data sets, and so on. With the control 349, the administrator can permit or deny users the opportunity to add new content.

In some cases, the custom application may be generated to provide end users with a specific dashboard or document. For example, the custom application generation can be used to translate or convert a dashboard, web page, dossier, or other interactive document into the look and feel of a native or standalone application, while retaining the ability to access a database, file repository, and other underlying services that are needed for the document.

One example of this is that a document, such as a reporter dashboard, can be turned into an application and distributed to a group of users. The content of the source dashboard or report can be configured to update based on the current data set from the database server. For example, in the application form, the content of the source report can be presented and shown up to date with live data, including data that is streamed or automatically refreshed. In addition, the layout, style, set of visualizations, tables, text, and other aspects of the source document can be preserved, unless the administrator decides to override them with a visual theme.

When the administrator creates an application based on a source document, the system can create a copy or a forked version of that document to be shared among users of the application. For example, when a user interacts with a report view in the custom application and applies an annotation, such as a text comment, that comment can be automatically propagated and included in the view of the report shown to other users of the same custom application. However, the annotation would not be provided or propagated back to the source document itself. In other words, the application views and content in the application can be shared with other users of the application. But there is a clean break between the application and the source document from which the custom application derived its content.

In other situations, a custom application may be designed to give a broader view of content and a broader selection of features. For example, a custom application can provide a window or portal into a user's entire document collection, or even applications and services available through the application server or database server of an organization. For example, the system administrator for an organization may desire to make certain types of information and certain features of the enterprise platform available to users while restricting other features. As a result, the custom application may allow access to a user's personal document library and shared documents, and may even permit creation of new documents, but may disallow some other features that the platform supports, such as changing settings, accessing the overall document collection of the organization, and so on. As a result, the administrator has the ability to create different applications for different user groups and different use cases, with each custom application being tailored for the needs of a different group.

Figure 3G:
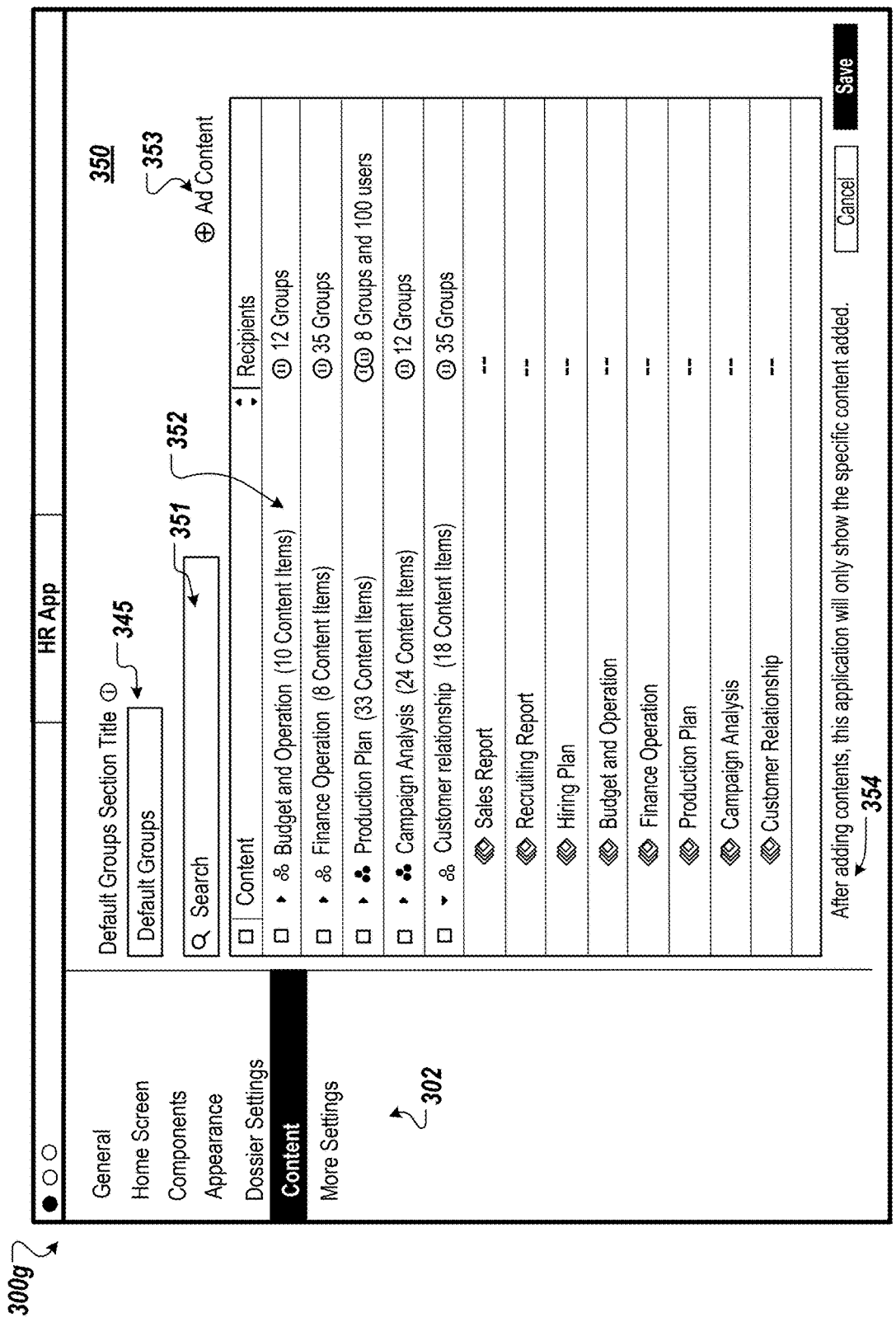

FIG. 3G shows another example of a content tab 350. The content tab 350 includes a control 355 that enables the administrator to specify which group of users the content settings apply to. In some cases, and administrator can specify that the same custom application presents a different set of content or a different set of content restrictions for different user groups. This selective access to different content items can go beyond showing different language content to different user groups, for example, different user groups can be provided different sets of documents or different levels of functionality. These settings can be performed separate from security and authorization and permission levels. Is noted above, the content settings for the custom application can restrict content access beyond the limits of permissions, so that the administrator creating the custom application may restrict at least some users to view and interact with less than all of the content and documents that they have authorization to access. This can be an important step to streamline and differentiate different custom applications, especially to create applications tailored for specific purposes or tasks.

The content tab 350 includes several ways for administrators to specify content to be made accessible through the custom application. One example is the control 353 that can be selected to bring up a file selection interface to add documents, media, data sets, and so on. Another example is the search control 351, which is a text entry search field where an administrator can enter search terms and see results in a drop-down list below the text entry field. The administrator can then select from among the results to add result items (e.g., documents, data sets, etc.) to the application being created. The area 352 also allows drag and drop addition of content items to the custom application. The area 352 also lists the content items that have been made accessible through the application. These content items can be grouped together by category, by owner, by department, or by other criteria. In this example, there are content items from various different categories, which the administrator can expand to view items. The area 352 can also show additional details such as the set of recipients, having access to the added content items and so on.

The content tab 350 includes a note 354 explaining that, in this example, by specifying content in the content tab 350, the custom application will restrict users to viewing that content in particular.

When an administrator adds content to a custom application, the system automatically tracks and records the dependencies needed for operation of that added content. For example, if a dashboard is added, and creating a view of the dashboard involves access to a data set or data source, The system identifies this data dependency and preserves it so that the system can access that same data that is needed to provide the custom application. In a similar manner, the system can identify and provide access to third party systems through various application, programming interfaces, remote procedure, calls, and so on. As a result, when an administrator adds content to the custom application, the system will maintain the links to databases, repositories, metadata, objects, Internet resources, and so on to make the interactive functionality and data refreshing capabilities of the source content available in the custom application as well.

Figure 3H:
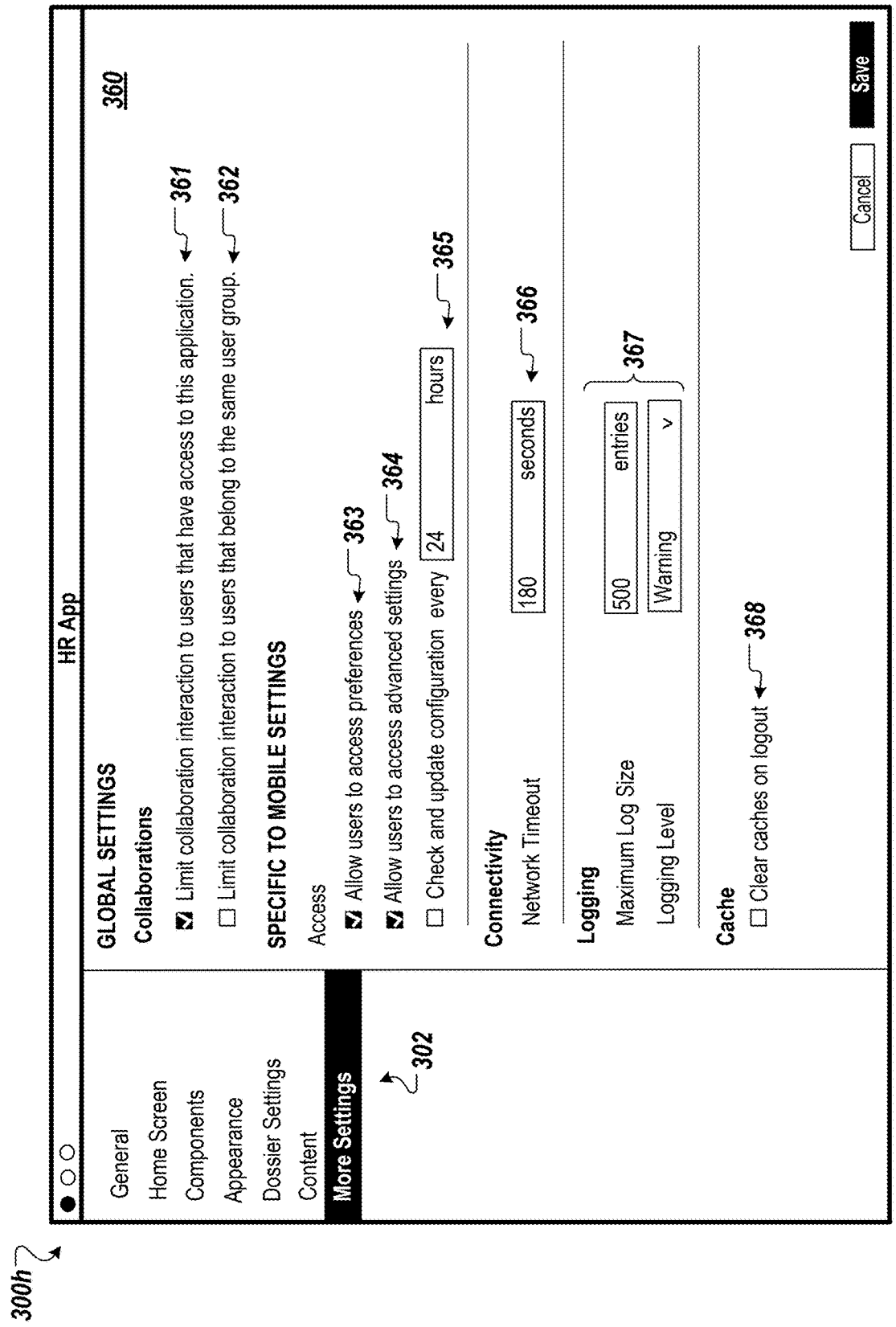

FIG. 3H shows a settings tab 360 that enables an administrator to set various settings and configuration properties for how the custom application will behave. For example, some of the settings can govern whether and how users of the custom application will be able to share content with other users, whether within the custom application or outside of the custom application. For example, the control 361 allows the administrator to limit collaboration interaction to users that have access to the custom application being built. By checking the box for this control 361, the administrator causes the custom application to prevent sharing or exporting of content to users that are not authorized to run the same custom application. As a result, the custom application will restrict the set of sharing recipients to those that the server verifies also have been registered or invited or otherwise have authorization to access the same custom application. The control 362 enables the administrator to limit collaboration interaction to users that belong to the same user group. In other words, the control 362 you can be selected by the administrator to prevent any sharing from the application that would cross user group boundaries. In this example, the control 362 is not selected, so there are no restrictions on users in one user group sharing information through the custom application with users in a different user group.

The settings tab 360 also includes various mobile access settings. For example, the control 363 enables an administrator to specify whether users of the custom application are able to access their account preferences or not. The control 364 allows the administrator to set whether or not users can access various advanced settings. The control 365 enables the administrator to set whether the custom application should periodically check for updates, and if so, how frequently. In general, each time the custom application is requested or loaded, the most recent set of configuration data for the custom application is used to generate and send the application data for presentation. In addition, the control 365 allows more frequent updates to be done periodically during a session of use of the custom application. The settings tab 360 can include network connectivity settings. For example, the setting 366 enables the administrator to set a network timeout period to be used by the custom application. The controls 367 specify the nature of logging performed by the custom application, such as to set a maximum log size and to set a level of detail for logging. The control 368 specifies whether the custom application should clear local on device caches when the user logs out. These and other controls can be used to change the behavior of the custom application, for example, to tune performance, to adjust bandwidth usage, to adjust the level of device storage and memory used, and so on.

In addition to the techniques discussed above, various changes or variations can be made. For example, while the server 110 is able to dynamically assemble application data for each session, the server 110 and/or client devices may be configured to cache some or all of the application content. For example, the server 110 can generate a portion of an application (e.g., an initial view or a layout of toolbar functionality), and maintain that portion of the application ready to use. Until the configuration data for the application or the modules used in the application change, the cached portion can be re-used to reduce latency and increase efficiency. In addition, client devices can cache application components or application views to reduce network traffic requirements, and then update the components or application data as directed by the server 110. In many cases, each individual user receives a customized view, based on his or her own document library contents, annotations, preferences, and so on, and so a custom application is still often separately finalized for each user. Nevertheless, partial work of an application, such as control layout and style markup elements can be saved and reused, and merged with user-specific content dynamically generated by the server 110. The server 110 and client devices can coordinate so that the server 110 tracks the components that are cached at client devices, so the server 110 can send to client devices the updates or portions of an application that are needed, while the client devices can merge content from the server 110 with cached application components. For example, the client devices may temporarily cache at least some received modules from the module repository 116, and those modules may be re-used at the client from one application to another, or from one session to another.

FIG. 4 is a flow diagram showing a method 400 performed by one or more computers.

The method 400 includes identifying, by the one or more computers, a predetermined set of application elements that are available to be selectively included in a custom application hosted by a server system (402).

The method 400 includes providing, by the one or more computers, an interface for generating the custom application, wherein the interface includes features to specify each of a plurality of adjustable settings, such that input through the interface can adjust an appearance of the custom application and select which of the predetermined application features are included in the custom application (404).

The method 400 includes receiving, by the one or more computers, input through the interface that specifies settings for the custom application including at least one of (i) a change to the appearance of the custom application or (ii) a customized set of the application features (406).

The method 400 includes, based on the input received through the interface, generating, by the one or more computers, configuration data for the custom application, wherein the configuration data specifies a configuration of the application elements to provide in the custom application based on the input received through the interface (408).

The method 400 includes updating, by the one or more computers, one or more records to make the custom application available to one or more client devices of one or more users, wherein the server system is configured to response to requests from client devices by generating and providing application data based on the stored configuration data (410).

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
   identifying, by the one or more computers, a predetermined set of application features that are available to be selectively included in a custom application hosted by a server system;
   storing, by the one or more computers, a repository of application elements corresponding to the application features, wherein the application elements in the repository include software modules for at least some of the application features;
   storing, by the one or more computers, a mapping of application features to application elements;
   providing, by the one or more computers, an interface for generating the custom application, wherein the interface includes features to specify each of a plurality of adjustable settings, such that the interface is configured to receive input information that specifies adjustments to an appearance of the custom application and selects application features from the predetermined set of application features for inclusion in the custom application;
   receiving, by the one or more computers, input through the interface that specifies settings for the custom application including at least one of (i) a change to the appearance of the custom application or (ii) a customized set of the application features;
   based on the input received through the interface, generating, by the one or more computers, configuration data for the custom application, wherein the configuration data specifies a configuration of the application features to provide in the custom application based on the input received through the interface;
   configuring, by the one or more computers, the server system to make the custom application available to one or more client devices of one or more users, wherein the server system is configured to dynamically generate the custom application from application elements in the repository when the custom application is requested by a client device, wherein the server system is configured to respond to a request for the custom application from the client device over a communication network by generating and providing application data based on the configuration data, including, in response to receiving the request for the custom application from the client device:
   based on the configuration data for the custom application, selecting application elements from the repository that correspond to application features specified by the configuration data for the custom application based on the mapping of application features to application elements in the repository;
   assembling the selected application elements from the repository according to the configuration data for the custom application to generate the application data for the custom application; and
   providing the application data to the client device over the communication network; and
   after generating the configuration data for the custom application:
   updating one or more of the application elements in the repository from a first version of the application element to a second version of the application element; and
   updating the mapping such that a particular application feature of the application features is mapped to the second version of the application element instead of the first version of the application element, wherein updating the mapping configures the server system to serve the custom application using the second version of the application element without modifying the configuration data for the custom application.

2. The method of claim 1, wherein providing the interface comprises providing a web page or web application that includes data that, when rendered, provides a user interface for designing the custom application.

3. The method of claim 1, wherein the input received through the interface specifies formatting for the application, and the configuration data stores the formatting such that, when the application is provided based on the configuration data, the formatting is propagated to each of multiple application elements selected to be included in the custom application.

4. The method of claim 1, wherein the interface is a user interface having controls that enable a user to (i) specify content for access within the custom application, wherein the content is selected from among content hosted by a database system, and (ii) restrict the custom application to providing the content specified through the interface.

5. The method of claim 1, wherein the application features include features that respectively perform different functions, the features including at least one of search, filter, share, comment on, or export data.

6. The method of claim 1, wherein the application features include navigation features for navigating within the custom application, the features including at least one of a toolbar, a sidebar, or menu item.

7. The method of claim 1, wherein the application features include features representing different types of user interaction or application behavior that are provided in the custom application.

8. The method of claim 1, wherein the application features include cross-platform features available in each of multiple platforms and platform-specific features available only in specific platforms, wherein the interface provides controls to select from among the cross-platform features and the platform-specific features.

9. A system comprising:
   one or more computers of a server system; and
   one or more computer-readable media storing instructions that are operable, when executed by the one or more computers, to cause the one or more computers to perform operations comprising:

identifying, by the one or more computers, a predetermined set of application features that are available to be selectively included in a custom application hosted by a server system;

storing, by the one or more computers, a repository of application elements corresponding to the application features, wherein the application elements in the repository include software modules for at least some of the application features;

storing, by the one or more computers, a mapping of application features to application elements;

providing, by the one or more computers, an interface for generating the custom application, wherein the interface includes features to specify each of a plurality of adjustable settings, such that the interface is configured to receive input information that specifies adjustments to an appearance of the custom application and selects application features from the predetermined set of application features for inclusion in the custom application;

receiving, by the one or more computers, input through the interface that specifies settings for the custom application including at least one of (i) a change to the appearance of the custom application or (ii) a customized set of the application features;

based on the input received through the interface, generating, by the one or more computers, configuration data for the custom application, wherein the configuration data specifies a configuration of the application features to provide in the custom application based on the input received through the interface;

configuring, by the one or more computers, the server system to make the custom application available to one or more client devices of one or more users, wherein the server system is configured to dynamically generate the custom application from application elements in the repository when the custom application is requested by a client device, wherein the server system is configured to respond to a request for the custom application from the client device over a communication network by generating and providing application data based on the configuration data, including, in response to receiving the request for the custom application from the client device:

based on the configuration data for the custom application, selecting application elements from the repository that correspond to application features specified by the configuration data for the custom application based on the mapping of application features to application elements in the repository;

assembling the selected application elements from the repository according to the configuration data for the custom application to generate the application data for the custom application; and providing the application data to the client device over the communication network; and after generating the configuration data for the custom application:

updating one or more of the application elements in the repository from a first version of the application element to a second version of the application element; and updating the mapping such that a particular application feature of the application features is mapped to the second version of the application element instead of the first version of the application element, wherein updating the mapping configures the server system to serve the custom application using the second version of the application element without modifying the configuration data for the custom application.

10. The system of claim 9, wherein the custom application provides access to each of multiple documents; and wherein the interface provides one or more controls that enable a user to specify a theme to apply to a single document of the multiple documents or to each of the multiple documents.

11. The system of claim 9, wherein the interface is a user interface having controls that enable a user to (i) specify content for access within the custom application, wherein the content is selected from among content hosted by a database system, and (ii) restrict the custom application to providing the content specified through the interface.

12. One or more non-transitory computer-readable media storing instructions that are operable, when executed by one or more computers, to cause the one or more computers to perform operations comprising:

identifying, by the one or more computers, a predetermined set of application features that are available to be selectively included in a custom application hosted by a server system;

storing, by the one or more computers, a repository of application elements corresponding to the application features, wherein the application elements in the repository include software modules for at least some of the application features;

storing, by the one or more computers, a mapping of application features to application elements;

providing, by the one or more computers, an interface for generating the custom application, wherein the interface includes features to specify each of a plurality of adjustable settings, such that the interface is configured to receive input information that specifies adjustments to an appearance of the custom application and selects application features from the predetermined set of application features for inclusion in the custom application;

receiving, by the one or more computers, input through the interface that specifies settings for the custom application including at least one of (i) a change to the appearance of the custom application or (ii) a customized set of the application features;

based on the input received through the interface, generating, by the one or more computers, configuration data for the custom application, wherein the configuration data specifies a configuration of the application features to provide in the custom application based on the input received through the interface;

configuring, by the one or more computers, the server system to make the custom application available to one or more client devices of one or more users, wherein the server system is configured to dynamically generate the custom application from application elements in the repository when the custom application is requested by a client device, wherein the server system is configured to respond to a request for the custom application from the client device over a communication network by generating and providing application data based on the configuration data, including, in response to receiving the request for the custom application from the client device:

based on the configuration data for the custom application, selecting application elements from the repository that correspond to application features specified by the configuration data for the custom application based on the mapping of application features to application elements in the repository;

assembling the selected application elements from the repository according to the configuration data for the custom application to generate the application data for the custom application; and providing the application data to the client device over the communication network; and after generating the configuration data for the custom application:

updating one or more of the application elements in the repository from a first version of the application element to a second version of the application element; and updating the mapping such that a particular application feature of the application features is mapped to the second version of the application element instead of the first version of the application element, wherein updating the mapping configures the server system to serve the custom application using the second version of the application element without modifying the configuration data for the custom application.

13. The method of claim 1, wherein, for a first application feature of the application features, the repository stores different application elements that are respectively configured to provide the first application feature for different computing platforms; and wherein selecting the application elements in response to receiving the request from the client device comprises selecting, for the client device, one of the application elements that is configured to provide the first application feature for the computing platform of the client device.

14. The method of claim 1, comprising storing, in the repository, multiple different application elements for each of at least some of the application features;

wherein the server system is configured to serve the custom application to different computing platforms using different combinations of the application elements in the repository, wherein the different combinations of the application elements are each selected based on the generated configuration data.

15. The method of claim 1, wherein the generated configuration data includes identifiers for application features to be included in the custom application; and wherein the mapping specifies a correspondence between identifiers for application features and identifiers for application elements that implement the corresponding application features.

16. The method of claim 1, wherein the server system stores different sets of configuration data that respectively define characteristics of different custom applications; and wherein the server system is configured to use the repository of application elements to serve each of the different custom applications, such that assembled versions of the different custom applications provided to client devices each share application elements from the repository.

17. The method of claim 1, wherein the server system is configured to provide the custom application to client devices, including each time the custom application is requested assembling the custom application from most recent versions of the application elements that are present in the repository when the custom application is requested, and including providing the custom application using different versions of the application elements at different times based on the configuration data for the custom application even through the configuration data for the custom application has not changed.

18. The method of claim 1, wherein providing the interface comprises providing user interface data to provide a user interface that includes a control for each of multiple application features of the application features, and wherein each control is selectable by a user to specify whether the application feature corresponding to the control is included in the custom application.

* * * * *